(12) United States Patent
Lin et al.

(10) Patent No.: US 7,879,770 B2
(45) Date of Patent: Feb. 1, 2011

(54) OXIDATIVE INTERNAL BREAKER FOR VISCOELASTIC SURFACTANT FLUIDS

(75) Inventors: Lijun Lin, Stafford, TX (US); Yiyan Chen, Richmond, TX (US); Philip F. Sullivan, Bellaire, TX (US); Belgin Baser, Houston, TX (US); Carlos Abad, Richmond, TX (US); Jesse C. Lee, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 928 days.

(21) Appl. No.: 11/532,565

(22) Filed: Sep. 18, 2006

(65) Prior Publication Data

US 2008/0070813 A1    Mar. 20, 2008

(51) Int. Cl.
| C09K 8/74 | (2006.01) |
| C09K 8/68 | (2006.01) |
| C09K 8/524 | (2006.01) |
| C09K 8/60 | (2006.01) |
| C09K 8/528 | (2006.01) |

(52) U.S. Cl. .................. 507/269; 507/203; 507/239; 507/240; 507/241

(58) Field of Classification Search .............. 507/269, 507/203, 239, 240, 241
See application file for complete search history.

(56) References Cited

U.S. PATENT DOCUMENTS

| 3,953,341 | A | * | 4/1976 | Martin ................ 507/226 |
| 5,501,275 | A | | 3/1996 | Card et al. |
| 5,551,516 | A | | 9/1996 | Norman et al. |
| 5,782,300 | A | | 7/1998 | James et al. |
| 5,964,295 | A | | 10/1999 | Brown et al. |
| 5,979,555 | A | | 11/1999 | Gadberry et al. |
| 5,979,557 | A | | 11/1999 | Card et al. |
| 6,035,936 | A | | 3/2000 | Whalen |
| 6,138,760 | A | | 10/2000 | Lopez et al. |
| 6,140,277 | A | | 10/2000 | Tibbles et al. |
| 6,258,859 | B1 | | 7/2001 | Dahayanake et al. |
| 6,306,800 | B1 | | 10/2001 | Samuel et al. |
| 6,399,546 | B1 | | 6/2002 | Chang et al. |
| 6,435,277 | B1 | | 8/2002 | Nelson et al. |
| 6,506,710 | B1 | * | 1/2003 | Hoey et al. ................ 507/242 |
| 6,509,301 | B1 | | 1/2003 | Vollmer |
| 6,637,517 | B2 | | 10/2003 | Samuel et al. |
| 6,667,280 | B2 | | 12/2003 | Chang et al. |
| 7,028,775 | B2 | | 4/2006 | Fu et al. |
| 7,261,160 | B2 | * | 8/2007 | Welton et al. ............... 166/300 |
| 2003/0119680 | A1 | | 6/2003 | Chang et al. |
| 2003/0234103 | A1 | | 12/2003 | Lee |
| 2005/0037928 | A1 | | 2/2005 | Qu et al. |
| 2006/0041028 | A1 | | 2/2006 | Crews |
| 2006/0272816 | A1 | | 12/2006 | Willberg |
| 2007/0125536 | A1 | | 6/2007 | Acock |

FOREIGN PATENT DOCUMENTS

| GB | 2366307 A1 | 6/2002 |
| GB | 2383809 A | 9/2003 |
| WO | 0211874 A1 | 2/2002 |
| WO | 02064945 A1 | 8/2002 |
| WO | 2005121273 A1 | 12/2005 |

* cited by examiner

*Primary Examiner*—Timothy J. Kugel
*Assistant Examiner*—Atnaf Admasu
(74) *Attorney, Agent, or Firm*—Martin Rzaniak; David Cate; Robin Nava

(57) ABSTRACT

Compositions and methods are given for delayed breaking of viscoelastic surfactant gels inside formation pores, particularly for use in hydraulic fracturing. Breaking inside formation pores is accomplished without mechanical intervention or use of a second fluid. Oxidizing agents such as air, oxygen, persulfates, bromates, peroxides, and others are used. The break may be accelerated, for example with a free radical propagating species, or retarded, for example with an oxygen scavenger. In certain brines, for example bromide brines, certain zwitterionic viscoelastic fluid systems that can decarboxylate and that require an anion-containing co-surfactant undergo delayed degradation if oxygen is present, for example from fluid preparation or in a foam.

19 Claims, 32 Drawing Sheets

(a)  (b)

(a)  (b)

(a)

(b)

(a)

(c)

(b)

(a) (b)

(a) (b)

OXIDATIVE INTERNAL BREAKER FOR VISCOELASTIC SURFACTANT FLUIDS

CROSS-REFERENCE TO RELATED APPLICATIONS

This application is related to copending application "Internal Breaker for Oilfield Treatments," inventors Jesse Lee, Philip Sullivan, Erik Nelson, Yiyan Chen, Carlos Abad, Belgin Baser, and Lijun Lin, filed Sep. 18, 2006. This application is related to copending application "Internal Breaker for Oilfield Fluids," inventors Philip Sullivan, Yiyan Chen, Belgin Baser, Carlos Abad, Mehmet Parlar, and Gregory Kubala, filed Sep. 18, 2006. This application is also related to copending application "Method for Limiting Leakoff and Damage in Hydraulic Fractures," inventors Richard Hutchins, Marie Dessinges, and Carlos Abad, filed Sep. 18, 2006. These applications are all assigned to the assignee of the present application and are hereby incorporated in their entirety.

BACKGROUND OF THE INVENTION

The Invention relates to recovery of oil and gas from wells, and more particularly to breaking fluids inside formation pores when using viscoelastic surfactant fluid systems (VES's) as carrier fluids and treatment fluids.

There are many applications in which breakers are needed to decrease the viscosity of treatment fluids, such as fracturing, gravel packing, and acidizing fluids, viscosified with polymers or crosslinked polymers or viscoelastic surfactants. Most commonly, these breakers act in fluids that are in gravel packs or fractures; some breakers can work in fluids in formation pores. Breakers decrease viscosity by degrading polymers or crosslinks when the viscosifiers are polymers or crosslinked polymers. Breakers decrease viscosity by degrading surfactants or destroying micelles when viscosifiers are viscoelastic surfactant fluid systems. Most breakers are solids, for example granules or encapsulated materials, that do not enter the formation.

There is sometimes a need to break viscous fluids within the pores of formations, for example when viscous fluids enter formations during fracturing, gravel packing, acidizing, matrix dissolution, lost circulation treatments, scale squeezes, and the like. Breakers that are effective inside formations will be called internal breakers here. These fluids that enter the formation may be main treatment fluids (such as fracturing fluids) or they may be secondary fluids (such as flushes or diversion fluids such as viscoelastic diverting acids). Typically it is necessary that the break be delayed, that is that the breaker not act until after the fluid has performed its function.

The current practice to improve clean-up of VES fluids in matrices is to use pre-flush or post-flush fluids to dilute the system or to contact the system with a breaker. The major disadvantage of the use pre-flush or post-flush fluids is their limited interaction with the VES fluid due to the small interface between the two fluids. The efficiency of this breaking mechanism depends upon diffusion, which is slow in highly viscous fluids. Furthermore, the volumes of the flushes can be high.

Compositions and treatment methods using a delayed internal breaker, that acts without mechanical or chemical action by the operator, would be of value. It would be desirable to have a number of such materials so that they could be used under different subterranean conditions, for example different temperatures and different formation fluid chemistries.

SUMMARY OF THE INVENTION

One embodiment of the Invention is an oilfield treatment composition containing an aqueous fluid, a non-polymeric viscosifier and an oxidizing agent. The oxidizing agent is selected, for example, from peroxysulfuric acid, a peroxymonosulfuric acid salt, persulfates, peroxides, hydroperoxides, azo compounds, peracids, perborates, peresters, bromates, iodates, periodates, permanganates, chlorites, and hyperchlorites. The composition may optionally include a free radical propagating agent, for example ferrous ions, metabisulfites, reducing sugars, and reducing di-, tri-, oligo- and poly-saccharides. The composition may optionally an oxygen scavenger, for example sulfites, furanones, hydroxylamines, trivalent phosphorous compounds, phenolic antioxidants, thiosulfates, metabisulfites, hydrazines, carbohydrazides, hydroquinones, and erythorbates.

In another embodiment, the composition contains a base, for example a carbonate or an amine.

In yet another embodiment, the non-polymeric viscosifier is a viscoelastic surfactant, for example a zwitterionic surfactant, for example a betaine, or an amidoamine oxide.

In another embodiment, the viscoelastic surfactant is a betaine, the composition also contains a free radical propagating agent and a co-surfactant containing an anion, and the oxidizing agent is selected from oxygen, an oxygen source, and air; the betaine is capable of decarboxylating to form a quaternary amine that phase separates or precipitates in the presence of the co-surfactant. The free radical propagating agent is, for example, bromide, and the co-surfactant is, for example, an organic sulfonate.

Another embodiment is an oilfield treatment composition containing an aqueous fluid, a betaine surfactant, a free radical initiator, a free radical propagating agent, and a co-surfactant containing an anion; the betaine is capable of decarboxylating to form a quaternary amine that phase separates or precipitates in the presence of the co-surfactant.

Another embodiment of the Invention is a method of treating a subterranean formation penetrated by a wellbore involving a) injecting into the pores of the formation an aqueous gel, viscosified with a non-polymeric viscosifier, and an oxidizing agent soluble in the gel, and b) allowing the gel to degrade into a material soluble in a fluid in the pores after the injection.

Yet another embodiment of the Invention is a method of treating a subterranean formation penetrated by a wellbore involving a) injecting into the pores of the formation an aqueous gel viscosified with a betaine surfactant, a free radical initiator, a free radical propagating agent, and a co-surfactant containing an anion, and b) allowing the betaine to decarboxylate to form a quaternary amine that phase separates or precipitates in the presence of the co-surfactant after the injection.

Another embodiment is a method of breaking an aqueous gel viscosified with a non-polymeric viscosifier involving incorporating an oxidizing agent in the gel.

DETAILED DESCRIPTION OF THE INVENTION

Figure 1:
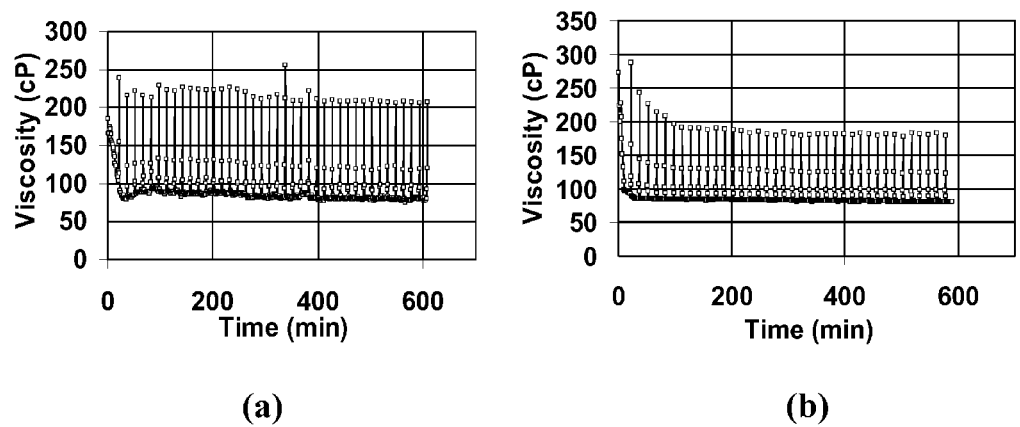
FIG. 1 shows the viscosity vs. time of a base VES fluid at two different temperatures.

For viscosified fluids used in oilfield treatments, it is important that there be a mechanism by which the viscosity can be reduced (that is, the fluid can be broken). Typically, breakers are added to the fluid. Typically, the action of the breaker is delayed or requires a trigger such as crushing of encapsulated breakers, so that the fluid may perform its function before the break occurs. Proper placement is an important feature for any breaker; it must be with the fluid that is to be broken. Once a fluid invades a formation, most conventional breakers (such as encapsulated oxidizing agents) cannot clean it up. Subsequently adding another fluid, such as an acid, will be inefficient because of the poor fluid-to-fluid contact.

Oxidizing agents have been tried in the past as breakers for fluids viscosified with non-polymeric viscosifying agents, but without success. U.S. Patent Application No. 2006-0041028 describes metal-mediated viscosity reduction of viscoelastic surfactant fluids and states in paragraph [0007] that "Conventional enzymes and oxidizers have not been found to act and degrade the surfactant molecules or the viscous micelle structures they form." U.S. Patent Application No. 2005-0037928 "Method of Using Viscoelastic Vesicular Fluids to Enhance Productivity of Formations" discloses vesicular aqueous viscoelastic surfactant based fluids that contain a surfactant, a quaternary amine polyelectrolyte, and a non-aqueous solvent. In the specification, these materials are repeatedly distinguished from fluids made with worm-like micelles, such as those fluids described in U.S. Pat. No. 6,435,277. The application discloses that the vesicular fluids are sensitive to pH and that they can be broken in the presence of acid. It further teaches that they may be broken by oxidative breakers. More specifically, it teaches that oxidizers may be the only added "breaker" when the fluid is used as a diverter of acid treatments because the fluid will come in contact with acid, but in fracturing fluids the oxidative breaker may only be used in combination with acid-releasing agents, and in fact the acid-releasing agents are suitable breakers alone. In contrast to these teachings, we have found that oxidizing agents may be used as breakers of VES fluids; the oxidizers are readily soluble in the VES fluid, and the break is activated by increasing temperature.

The Invention will be described primarily in terms of hydraulic fracturing, gravel packing, acidizing, and fracture acidizing, although it is to be understood that the Invention may be used in many other ways, for example many other oilfield treatments. In hydraulic fracturing, most of the injected fracturing fluid contains a proppant such as sand or synthetic ceramic beads, so that when the pressure is released the proppant is trapped between the fracture faces and prevents the fracture from completely closing, thus leaving a flowpath open. The injected fracturing fluid is normally viscosified. Increased viscosity results in formation of a wider fracture, thus a larger flowpath. A minimal viscosity is also required to transport adequate amounts of proppant; the actual viscosity required depends primarily upon the fluid flow rate and the density of the proppant. In a typical fracturing process, such as hydraulic fracturing with aqueous fluids, the fracture is initiated by first pumping a high viscosity fluid with good to moderate leak-off properties, and typically no proppant, into the formation. This initial fluid, typically referred to as a "pad", is usually followed by a second fluid (fracturing fluid) of similar viscosity carrying an initially low concentration and then a gradually increasing concentration of proppant into the extended fracture or fractures. The pad initiates and propagates the fracture but does not need to carry proppant. All the fluids tend to "leak-off" into the formation from the fracture being created or extended. Commonly, by the end of the job the entire volume of the pad will have leaked off into the formation. This leak-off is determined and controlled by the properties of the fluid (and additives it may contain, such as fluid loss additives or FLA's), the pumping rate and pressure, and the properties of the rock. A certain amount of leak-off greater than the minimal possible may be desirable, for example a) if the intention is to place some fluid in the rock to change the rock properties or to flow back into the fracture during closure, or b) if the intention is deliberately to cause what is called a "tip screen-out", or "TSO", a condition in which the proppant forms a bridge at the some point in the fracture, stopping the lengthening of the fracture and resulting in a subsequent increase in the fracture width. In acid fracturing, the fracture fluid is an acid (or other formation dissolving fluid such as a chelant-containing fluid) and the fluid normally does not contain proppant; the fracture is held open by asperities in the fracture faces caused by differential etching of the formation material. In matrix acidizing, an acid or other formation dissolving fluid is injected below fracture pressure and the fluid enters the formation and dissolves damaging materials and/or a portion of the formation. Proper leak-off control may be critical to the success of these and other oilfield treatments. In these and many other treatment types, after the treatment it is necessary to decrease the viscosity of the fluid, i.e. to break them, and a portion of the fluid in the pores of the formation.

Oxidizing Agents We have found that certain materials may be used as delayed oxidative internal breakers for polymer-free (VES) fluid viscosifiers; the break by the oxidizing agent may be triggered naturally due to chemical or physical conditions, for example temperature or pH. It is well known that the decomposition rate constant of some radical initiators is not only temperature but also pH dependent (See, for example, "Polymer Handbook, Section II, Decomposition Rates of Organic Free Radical Initiators", J. Brandrup, and E. H. Immergut, Third Edition, Wiley Interscience.) The rate of decomposition may also be altered by appropriately selecting a counterion for the oxidizing agent, (e.g. sodium, potassium, and ammonium). The break may optionally be accelerated by using redox activators, for example sodium metabisulfite, iron (II) sulfate, reducing sugars, for example glucose and others, reducing di and trisaccharides, and reducing oligo and polysaccharides. The break may optionally be delayed, for example by the addition of oxygen scavengers, for example substituted Benzofuranones (for example Ciba Specialty Chemicals lactone HP-136), hydroxylamines, trivalent phosphorus compounds, for example organic phosphites (and phosphonites) such as TNPP, CIBA Specialty Chemicals Irgafox® 168, CIBA Specialty Chemicals, Irgafox® P-EPQ, CIBA Specialty Chemicals, phenolic antioxidants, for example di terbutl alkyl phenols, and others such as those of the Irganox® family such as IRGANOX® L 115, IRGANOX® L 109, IRGANOX® L 107, IRGANOX® L 1010, IRGANOX® L 1035, IRGANOX® L 1076, IRGANOX® L 1081, IRGANOX® L 1098, IRGANOX® L 1135, IRGANOX® L 1330, IRGANOX® L 3114, IRGANOX® L 245, IRGANOX® L 3114, IRGANOX® B 1411, IRGANOX® B 1412, IRGANOX® B 215, IRGANOX® B 220, IRGANOX® B 225, IRGANOX® B 311, IRGANOX® B 561, IRGANOX® B 612, IRGANOX® B 900, IRGANOX® B 921, IRGANOX® E 201, IRGANOX® E1 1291, IRGANOX® HP 2215, IRGANOX® HP 2225, IRGANOX® HP 2251, IRGANOX® HP 2341, IRGANOX® HP 2411, IRGANOX® HP 2921, IRGANOX® MD 1024, IRGANOX® PS 800, IRGANOX® PS 802, IRGANOX® XP 320, IRGANOX® XP 420, and IRGANOX® XP 620, trigonox, sulfur compounds such as sodium thiosulfate, hydroquinone, natural antioxidants, for example the natural polyphenols, such as apigenin, resveratrol, ascorbic acid and vitamin C, vitamin E (or alpha-tocopherol), such as IRGANOX® E 201 CIBA Specialty Chemicals, and also by other means if necessary. The break may also optionally be triggered by contact with another fluid, such as another injected fluid, a formation fluid, or a produced fluid such as an acid or basic preflush that will change the pH of the fluid and therefore change the kinetics of the oxidizer decomposition as well as the effect of the delay agent. Injecting another fluid to promote the break is not normally desirable because of potential costs and complexity, but is within the scope of the Invention. The internal breaking effect occurs whether or not a filter cake is also formed by the addition of a fluid loss additive; the breaker may also contribute to degradation of the filter cake.

Suitable oxidizing agents include peroxysulfuric acid; persulfates such as ammonium persulfate, sodium persulfate, and potassium persulfate; peroxides such as hydrogen peroxide, t-butylhydroperoxide, methyl ethyl ketone peroxide, cumene hydroperoxide, benzoyl peroxide, acetone peroxide, methyl ethyl ketone peroxide, 2,2-bis(tert-butylperoxy)butane, pinane hydroperoxide, bis[1-(tert-butylperoxy)-1-methylethyl]benzene, 2,5-bis(tert-butylperoxy)-2,5-dimethylhexane, tert-butyl peroxide, tert-butyl peroxybenzoate, lauroyl peroxide, and dicumyl peroxide; bromates such as sodium bromate and potassium bromate; iodates such as sodium iodate and potassium iodate; periodates such as sodium periodate and potassium periodate; permanganates such as potassium permanganate; chlorites such as sodium chlorite; hyperchlorites such as sodium hyperchlorite; peresters such as tert-butyl peracetate; peracids such as peracetic acid; azo compounds such as azobisisobutyronitrile (AIBN), 2,2'-azobis(2-methylpropionitrile), 1,1'-azobis(cyclohexanecarbonitrile), 4,4'-azobis(4-cyanovaleric acid), and, for example, those sold under the VAZO trade mark by DuPont such as Vazo® 52, Vazo® 64, Vazo® 67, Vazo® 88, Vazo® 56 WSP, Vazo® 56 WSW, and Vazo® 68 WSP; perborates such as sodium perborate; percarbonates; and perphosphates.

Among these oxidizing agents, a few have been tested in the laboratory; the results are given below in the examples. It should be understood that only a few examples are been shown for the use of tested oxidizers with a specific VES, at specific concentrations, in specific brines, at specific temperatures, and with or without specific accelerators and retarders at specific concentrations. The fact that a specific oxidizer was observed to be suitable or not in a specific case should not be taken as being a general conclusion for that oxidizer. The results of the testing are briefly summarized below.

Ammonium persulfate degrades the VES fluid (gel) used quickly at ambient temperature. Delayed breaking was not observed with ammonium persulfate alone, and there was a tendency for phase separation and/or precipitation. Sodium persulfate is a good internal breaker at intermediate temperatures such as around 65.6° C. (150° F.). It offers the type of break that is desired for fracturing and sand control fluids. The delay in breaking can be controlled by adjusting the persulfate concentration, by adjusting the pH, or by incorporating additional chemicals that can retard (such as sodium thiosulfate) or accelerate (such as ferrous sulfate) the degradation. One limitation of sodium persulfate is that it does not appear to be able to break the gel at temperatures below about 37.8° C. (100° F.) unless a breaker aid such as ferrous ion is added. Another limitation of sodium persulfate is that it can break fluids too quickly and without a delay at relatively high temperatures such as about 93.3° C. (200° F.). Breaking in heavy brines is rather complex. Overall, breaking in heavy brines could be achieved although delay may not be easy to obtain. It was observed that the pH was very low after breaks. Not to be limited by theory, but it may be that the persulfate is acting not only as an oxidizing agent but also by reducing the pH and by increasing the ionic strength. Potassium persulfate performed similarly to sodium persulfate. At relatively low concentrations, the potassium salt appeared to be less active than the sodium salt.

Sodium bromate, if used alone, can degrade the gel only if the fluid is at relatively high temperatures, such as above about 79.4° C. (175° F.). No delay was observed, however, when breaking occurred. It should be noted that breaking is expected to occur at lower temperatures if a suitable breaker aid is used, or if the pH is reduced.

Hydrogen peroxide was observed to offer delayed breaking in low salt environments, depending upon the peroxide concentration and the fluid temperature. In heavy brines, there may be compatibility issues with certain brines such as heavy calcium chloride. Chemical accelerators and retarders may change the rate the viscosity reduction. One potential reaction accelerator is ferrous ion. t-Butylhydroperoxide may be a suitable internal breaker in heavy sodium bromide brines. In low salt environments, delay is difficult to achieve by simply varying the peroxide concentration. Oxone tetrabutylammonium salt offers instantaneous breaking without delay in low salt environments. It may react with certain heavy brines.

Overall, all of these oxidizers can break VES gels depending upon the breaker concentration and the fluid temperature. Some provide a delay, and others may not.

Enhanced Oxidative Destabilization We have found that certain viscoelastic surfactants, for example certain zwitterionic surfactants, for example certain betaines, are spontaneously degraded through a radical decarboxylation reaction. This reaction is triggered by oxygen, an oxygen source, air (for example air or oxygen dissolved in the fluid or present in a foam), or by radical-generating compounds, and this reaction is promoted by the presence of free radical reaction propagating species such as bromide, for example in bromide brines. (Chloride has the same effect, but to a much lesser degree.) This enhanced oxidative destabilization is particularly effective in breaking viscoelastic surfactant based fluids if they contain co-surfactants that can be removed from solution by quaternary amines. A representative scheme is shown below for a system containing a betaine surfactant. In heavy brines, which commonly contain bromide, many, although not all, betaines require a co-surfactant, such as sodium dodecylbenzene sulfonate, to gel.

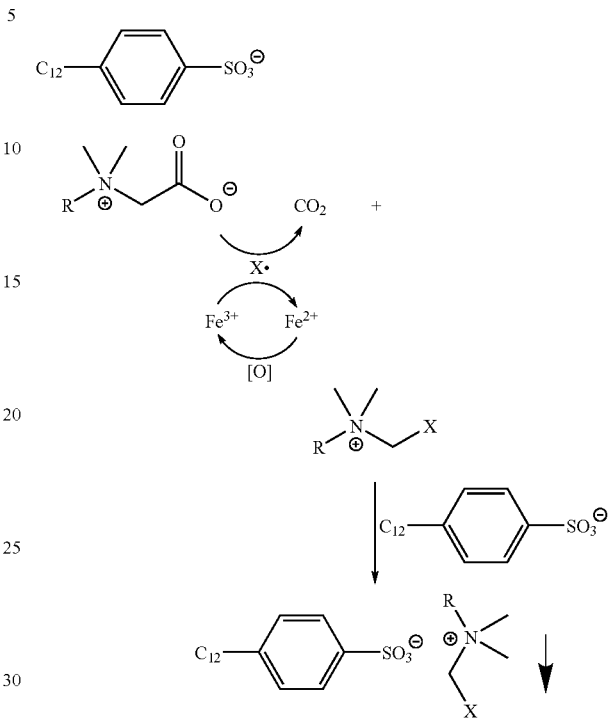

The scheme shows that oxygen, or another species, generates a radical that triggers decarboxylation of the betaine, producing carbon dioxide and a quaternary amine (which may itself be a viscoelastic surfactant). The quaternary amine readily combines with the anionic dodecylbenzene sulfonate (or similar material) and the combined complex phase separates or precipitates from the fluid. The concentration of the original co-surfactant is low, and it is needed to maintain the stability of the viscoelasticity of the gel, so only a small extent of decarboxylation of the betaine will remove enough co-surfactant to destroy (break) the viscoelasticity of the gel in the high brine system. The fluid will then not be capable of transporting proppant or gravel. Oxygen or free radical generators promote this reaction. Oxygen or air may therefore be added to fluids 9 or not removed from fluids), if appropriate. Free radical scavengers, such as $FeCl_3$ shown here, slow the reaction by competing for the free radicals that promote the decarboxylation. Bromide may facilitate free radical generation, and certainly promotes free radical chain reaction propagation, so bromide promotes the break. Thus the break can be controlled by controlling the relative amounts of free radical generators, propagators, and scavengers, and the ratio of co-surfactant to surfactant. Even in systems where free radical propagators are not present, and/or the co-surfactant is not needed, eventually decarboxylation will destroy sufficient surfactant to break the fluid. In some systems (for example at approximately neutral pH or at low temperature), this mechanism might compete with destruction of the surfactant by hydrolysis.

The Invention (from this point on the discussion refers to both oxidizing agents and enhanced oxidative destabilization) is particularly suited for use with polymer free fluids. The Invention is especially useful in gravel packing and the like, where near-wellbore damage is often a particularly serious problem. The Invention makes it possible to treat wells previously eliminated as candidates due to the low fluid efficiency (high leak-off) that would have been expected. The oxidative internal breakers may be used as an alternative to fluid loss additives, especially when filter cakes are undesirable; instead of minimizing fluid loss, the fluid loss may be accepted and the leaked-off fluid broken. Viscosified fluids containing oxidative internal breakers may also function as a self-destructing diverting agents. They may also be used in kill pills, which can be difficult to break because mechanisms often available for breaking (such as crushing of encapsulated materials, or later addition of another component) cannot be used with kill pills.

In treatments that typically include multiple stages, such as most hydraulic fracturing, acid fracturing, frac-packing, and gravel packing embodiments, the oxidative internal breaker may be added in the pad, throughout the treatment or to only some of the stages, such as some of the proppant, gravel, acid, or diversion stages. An oxidative internal breaker is particularly useful in hydraulic fracturing, frac-packing, and gravel packing because mechanical removal methods are impossible and methods involving contacting the additive with an additional fluid are not always practical. The compositions and methods of the Invention are also particularly useful in cases where it is desirable to allow a certain amount of treatment fluid to enter the formation, for example for the purpose of altering formation wettability or oil or water saturation.

Treatment fluids used with the compositions and methods of the Invention typically also contain other materials such as demulsifiers, corrosion inhibitors, friction reducers, clay stabilizers, scale inhibitors, biocides, breaker aids, mutual solvents, surfactants, anti-foam agents, defoamers, viscosity stabilizers, iron control agents, diverters, emulsifiers, foamers, oxygen scavengers, pH control agents, buffers, and the like. Compatibility of oxidative internal breakers with such additives should be checked in the laboratory. The treatments of the Invention are conducted normally; the treatment fluid and additives are transported to the site, mixed, stored, and pumped in the usual ways for the respective chemicals. When Resin Coated Proppants (RCP's) are used, testing should be done to ensure that the RCP's and oxidative internal breakers and enhanced oxidative destabilizing systems are compatible and that neither interferes with the performance of the other; conventional natural and synthetic proppants and gravels may normally be used without testing.

The Invention is carried out by considering information about the well, the formation, the fluids and additives available, and criteria for a successful treatment, and preparing an optimized plan for maximizing treatment performance according to the data and the criteria. This is usually done by analyzing the well using treatment design and evaluation software; for example, in hydraulic fracturing software, pressure gradients are combined with fracture length and height evolution algorithms, complete leak-off information, and the effects of multiple fluid injections and their temperature changes.

The optimal concentration of the oxidative internal breaker can be determined by choosing the breaking time and rate and measuring the break with samples of the intended fluids under the intended formation conditions. The preferred concentration of oxidative internal breakers is from about 0.005 weight % to about 20 weight %, more preferred is in the range of about 0.01 weight % to about 10 weight %, and most preferred is in the range of about 0.1 weight % to about 5 weight %. (It should be understood that throughout this specification, when we list or describe a concentration or amount range as being useful, or suitable, or the like, we intend that any and every concentration within the range, including the end points, is to be considered as having been stated. Furthermore, each numerical value should be read once as modified by the term "about" (unless already expressly so modified) and then read again as not so modified unless otherwise stated in context. For example, "a range of from 1 to 10" is to be read as indicating each and every possible number along the continuum between about 1 and about 10. In other words, when we express a certain range, even if we explicitly identify or refer to only a few specific data points within the range, or even to no data points within the range, it is to be understood that the inventors appreciate and understand that any and all data points within the range are to be considered to have been specified, and that the inventors have possession of the entire range and all points within the range.) Measurement of breaking, and prediction and control of breaking, are familiar to those of ordinary skill in the arts of well stimulation and sand control.

If fluid loss additives are used, it is preferable, although not necessary, to use completely degradable fluid loss additives. Particularly desirable FLA's would be the "internal filter cake/matrix breaker" materials disclosed in copending U.S. patent application "Internal Breaker for Oilfield Treatments," inventors Jesse Lee, Philip Sullivan, Erik Nelson, Yiyan Chen, Carlos Abad, Belgin Baser, and Lijun Lin, filed Sep. 18, 2006. When the pad and the fracture fluid are polymer-free and any fluid loss additive is fully degradable, neither the near-wellbore formation nor the proppant bed left in the fracture after the job contains deleterious polymers or solids, as would be the case if the fracture fluid contained any polymer or if the fluid loss additive was not fully degradable. Therefore fracture conductivity is high and skin is low.

Any non-polymeric fluid, for example VES based fluid, that is compatible with the formation, the formation fluids, and the other components of the fluid, can be used in the Invention. Particularly effective non-limiting examples of fluids are those described in U.S. Pat. Nos. 5,551,516; 5,964,295; 5,979,555; 5,979,557; 6,140,277; 6,435,277; and 6,258,859, all hereby incorporated by reference. Vesicle-based fluids may be used, such as those described in U.S. Pat. No. 6,509,301, hereby incorporated by reference.

In some cases, a certain amount of leak-off is desired, for example so that a tip screen-out occurs in fracturing, a condition in which the proppant forms a bridge, preferably at the end of the fracture away from the wellbore, stopping the lengthening of the fracture and resulting in a subsequent increase in the fracture width. For example, hydraulic fracturing followed by gravel-packing in a single operation, sometimes called a frac-pac, fracpac, frac pac, frac and pac, or StimPac, sometimes with a deliberate tip screen-out to generate a short wide fracture, is usually performed in relatively high permeability formations for sand-control purposes. However, such operations are sometimes performed in low permeability formations, occasionally for sand control, but also for other reasons, for example to bypass permeability damage near the wellbore caused by scaling or to improve upon poor communication between the wellbore and the formation or a previous fracture, or in formations in which perforating creates damaging fines, or for other reasons. Such jobs designed to generate short wide fractures may also be performed without subsequent gravel-packing when sand control is not an issue. The methods of the present Invention can be used in any of these cases (fracturing followed by gravel packing and/or fracturing for short wide fractures, in either case with or without deliberate tip screen-out).

The acid used in the matrix acidizing and acid fracturing methods of this Invention can be any acid used in acid fracturing, including gelled, self-diverting, and delayed acids. Commonly used, but not limiting, acids are hydrochloric, hydrofluoric, fluoboric, acetic, and formic acids and mixtures thereof, and those acids in the form of oil external emulsions (for reaction rate retardation), or oil internal emulsions (for hydrocarbon solvency). The acids can contain additives such as corrosion inhibitors and chelants used to help dissolve rock components and keep them in solution. Gelled, self-diverting, and delayed acids can be gelled with suitable VES's. Some oxidative internal breakers may not be compatible with acid, or with strong acid, and laboratory tests should be performed to determine compatibility.

Although in conventional propped fracturing the most common way to control fluid loss is to build an impermeable or reduced-permeability filter cake on the fracture walls (faces), in acid fracturing, especially with a low viscosity ungelled acid, pad viscosity is important for fluid loss control. On the other hand, if the acid is viscosified with a VES system, then if the VES has higher low-shear viscosity than high-shear viscosity, which is common, then as the VES leaks off a short distance into the formation, the flow rate decreases, the shear rate therefore decreases, and the fluid becomes more viscous. Such effects can reduce low viscosity ungelled acid leak-off better than a wall building system that dissolves or decomposes in acid. In these cases, an oxidative internal breaker would be particularly suitable in the pad. This allows acid treatment a certain selected depth into the formation and the acid then performs the very desirable function of diverting subsequent acid. Similarly, some oxidative internal breakers may be used with viscoelastic diverting acids, which are acids containing certain viscoelastic surfactants, such that the fluid has low viscosity as formulated and injected, but increases in viscosity as the acid reacts with the formation, such as a carbonate. Examples of such systems were described in U.S. Pat. Nos. 6,399,546, 6,667,280, and 7,028,775 and U.S. Patent Application No. 2003-0119680, all hereby incorporated by reference.

Sometimes acid fracturing is performed with a series of alternating pad, acid, pad, acid, etc. stages in order to optimize coverage. The first non-acidic pad initiates a fracture for the first acid stage to follow. That first acid stage etches a portion of the fracture face. Subsequent stages of pad and acid repeat the process until the designed treatment volumes have been injected and the desired fracture has been created. In the past, this process has always used a gelled pad, such as one containing a viscoelastic surfactant system. The oxidative internal breaker of the Invention may be used in at least the first pad and sometimes in all the pad stages. Similarly, matrix acidizing may be performed with alternating stages of acid and another fluid, such as a diverter, some or all of which may be viscosified; the oxidative internal breaker of the Invention may be included in some or all of either the acid or the other fluid to break a viscosifier.

The oxidative internal breakers of the Invention may be added to a wellbore fluid by metering them in to the base water fluid as a concentrated liquid. If the material is received as an emulsion, dispersion, or slurry, it can be stored in that form and used in that form directly. If it is received in dry form (for example as a solid dispersible powder of fine particles or as a dry emulsion) the particles can be pre-dispersed in water or brine as required and metered in as a liquid stream, or alternatively they may be added as solids to the base fluid stream.

The reactivity of a given oxidative internal breaker at a particular temperature and in contact with a viscosified fluid or fluids of a particular composition (for example pH and the concentration and nature of other components, especially electrolytes), is readily determined by a simple experiment: exposing the fluid or fluids to the oxidative internal breaker under treatment conditions and monitoring the viscosity.

Although the oxidative internal breakers of this Invention may be used with VES's made with any type of surfactant, or mixtures of surfactants, with or without one or more co-surfactants, and with or without other additives intended to stabilize or modify the properties of the micelles or vesicles (such as buffers, shear recovery additives, salts, and rheology boosters). Preferred VES's are cationic, anionic, amphoteric, and zwitterionic. Suitable VES's, for example, are described in the following U.S. patents, all of which are hereby incorporated in their entirety: U.S. Pat. Nos. 5,964,295; 5,979,557; 6,306,800; 6,637,517; and 6,258,859. The viscoelastic surfactant may be, for example, of the following formulae: R—Z, where R is the hydrophobic tail of the surfactant, which is a fully or partially saturated, linear or branched hydrocarbon chain of at least 14 carbon atoms and Z is the head group of the surfactant which may be for example $-NR_1R_2R_3^+$, $-SO_3^-$, $-COO^-$ or, in the case where the surfactant is zwitterionic, $-N^+(R_1)(R_2)R_3-COO^-$ where R1, R2 and R3 are each independently hydrogen or a fully or partially saturated, linear or branched, aliphatic chain of at least one carbon atom; and where $R_1$ or $R_2$ may comprise a hydroxyl terminal group.

Cleavable viscoelastic surfactants, for example of the following formula, may be used, as disclosed in International Patent Application WO02/064945: R—X—Y—Z, where R is the hydrophobic tail of the surfactant, which is a fully or partially saturated, linear or branched hydrocarbon chain of at least 18 carbon atoms, X is the cleavable or degradable group of the surfactant which is an acetal, amide, ether or ester bond, Y is a spacer group which is a short saturated or partially saturated hydrocarbon chain of n carbon atoms where n is at least equal to 1, preferably 2 and, when n is equal to or greater than 3, the chain may be a straight or branched saturated or partially saturated chain, and Z is the head group of the surfactant which can $NR_1R_2R_3^+$, $-SO_3^-$, $-COO^-$ or, in the case where the surfactant is zwitterionic, $-N^+(R_1R_2R_3-COO^-)$ where R1, R2 and R3 are each independently hydrogen or a fully or partially saturated, linear or branched, aliphatic chain of at least one carbon atom, possibly comprising a hydroxyl terminal group. Due to the presence of the cleavable or degradable group, cleavable surfactants are able to degrade under downhole conditions.

A nonlimiting example of a suitable cationic viscoelastic surfactant useful for the implementation of the Invention is N-erucyl-N,N-bis(2-hydroxyethyl)-N-methyl ammonium chloride. Nonlimiting examples of some suitable anionic viscoelastic surfactants useful for the implementation of the Invention are monocarboxylates $RCOO^-$ such as oleate where R is $C_{17}H_{33}$ or di- or oligomeric carboxylates such as those disclosed in International Patent Application WO 02/11874.

The oxidizing agents and enhanced oxidative destabilization of this Invention have been found to be particularly useful breakers when used with several types of zwitterionic surfactants. In general, suitable zwitterionic surfactants have the formula:

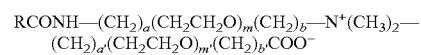

in which R is an alkyl group that contains from about 11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and $CH_2CH_2O$ may also be oriented as $OCH_2CH_2$. Preferred surfactants are betaines and amidoamine oxides.

Two examples of betaines are oleylamidopropyl dimethyl betaine and erucylamidopropyl dimethyl betaine. Oleylamidopropyl dimethyl betaine contains an oleyl acid amide group (including a $C_{17}H_{33}$ alkene tail group); erucylamidopropyl dimethyl betaine contains an erucic acid amide group (having a $C_{21}H_{41}$ tail group). Betaine surfactants, and others that are suitable, are described in U.S. Pat. No. 6,258,859.

Although the Invention has been described throughout using the term "VES", or "viscoelastic surfactant" to describe the non-polymeric viscosified aqueous fluid, any non-polymeric material may be used to viscosity the aqueous fluid provided that the requirements described herein for such a fluid are met, for example the required viscosity, stability, compatibility, and lack of damage to the wellbore, formation or fracture face. Examples, without regard to whether they form, or are described as forming, vesicles or viscoelastic fluids, include, but are not limited to, those viscosifiers described in U.S. Pat. No. 6,035,936 and in GB application No. 2,366,307A.

Also optionally, fracturing fluids may contain materials designed to assist in proppant transport and/or to limit proppant flowback after the fracturing operation is complete by forming a porous pack in the fracture zone. Such materials can be any known in the art, such as are available from Schlumberger under the tradename PropNET™ (for example see U.S. Pat. No. 5,501,275). Exemplary proppant flowback inhibitors include fibers or platelets of novoloid or novoloid-type polymers (U.S. Pat. No. 5,782,300).

The choice of oxidative internal breaker is based primarily on the desired time before the delayed break, which will depend upon the choice and concentration of VES and the temperature, and may depend upon the size of the job, the nature of the job, and other factors known to those of ordinary skill in the art. Similarly, appropriate delay agents or accelerating agents and their concentrations may be determined by simple laboratory experiments, for example mixing all the components, heating to the job temperature, and monitoring the viscosity. A requirement is compatibility of the water with the VES system and with the oxidative internal breaker. The system comprising an oxidative internal breaker also works with VES systems that contain co-surfactants or other additives commonly included in oilfield treatment fluids. Again, a requirement is compatibility of the oxidative internal breaker, the VES system, and the other components. The fluid containing an oxidative internal breaker may be batch-mixed or mixed on-the-fly.

Any additives normally used in such treatments may be included, again provided that they are compatible with the other components and the desired results of the treatment. Such additives can include, but are not limited to, corrosion inhibitors, delay agents, biocides, buffers, fluid loss additives, etc. The wellbores treated can be vertical, deviated or horizontal. They can be completed with casing and perforations or open hole.

In gravel packing, or combined fracturing and gravel packing, it is within the scope of the Invention to apply the compositions and methods of the Invention to treatments that are done with or without a screen. Although treatments are normally done to promote hydrocarbon production, it is within the scope of the Invention to use the compositions and methods of the Invention in wells intended for the production of other fluids such as carbon dioxide, water or brine, or in injection wells. Although we have described the Invention in terms of unfoamed fluids, fluids foamed or energized (for example with nitrogen or carbon dioxide or mixtures thereof) may be made. Adjustment of the appropriate concentrations due to any changes in the fluid properties (or other parameters, such as proppant concentration) consequent to foaming would be made.

Examples

Oxidizing Agents

Base Fluids ("Fluids" referred to here are gels.) All fluids were evaluated in a Fann 50 Rheometer. This instrument takes about 15-20 minutes to reach temperature, so that early portion of the data reflects heating to the final temperature. The instrument sometimes showed small regular fluctuations around the intended temperature, so small oscillations in the observed viscosities in some figures reflects that occurrence. Experiments were performed in which a viscoelastic fluid was heated to and held, usually at 65.6° C. (150° F.) or 93.3° C. (200° F.), with and without breakers and other additives. In a first set of experiments, a base fluid was made in distilled water with 4 volume % of a viscoelastic surfactant concentrate (containing about 38 weight % erucylamidopropyl dimethyl betaine surfactant, 1.1 weight % polynaphthalene sulfonate, 22 weight % isopropanol, 5 weight % sodium chloride and the remainder water), 2 weight % KCl for clay stabilization, and 1 volume % 2-butoxyethanol as a shear recovery enhancer. The shear rates were 100, 75, 50, 25, 50, 75, and 100 sec$^{-1}$ when shear ramps were run, and the rate was constant at 100 sec$^{-1}$ between ramps. (This same pattern of ramps was run in all the experiments reported here unless noted otherwise.) FIG. 1 shows the results at (a) 65.6° C. (150° F.) and at (b) 93.3° C. (200° F.). It can be seen that there was no degradation of the surfactant or of the micelles reflected as a decrease in viscosity for at least 10 hours.

Figure 2:
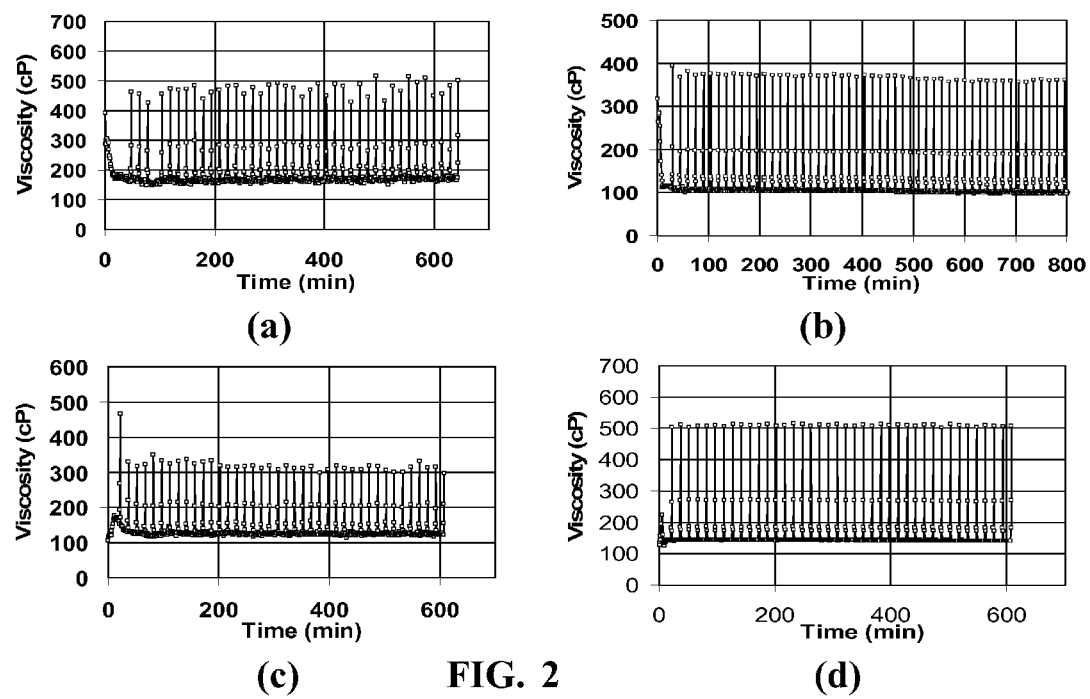
FIG. 2 shows the viscosity vs. time of the base VES fluid in different density brines.

A base fluid containing 6 volume % the same viscoelastic surfactant concentrate as used above was evaluated (a) in a 1.39 kg/L (11.6 ppg (pounds per gallon)) sodium bromide brine at 65.6° C. (150° F.), (b) in the same brine at 93.3° C. (200° F.), (c) in a 1.50 kg/L (12.5 ppg) sodium bromide brine at 65.6° C. (150° F.), and (d) in the same brine at 93.3° C. (200° F.). FIG. 2 shows the results; there was no degradation of the surfactant or of the micelles reflected as a decrease in viscosity. This VES system does not need a salt to gel, and so is not subject to enhanced oxidative destabilization.

Figure 3:
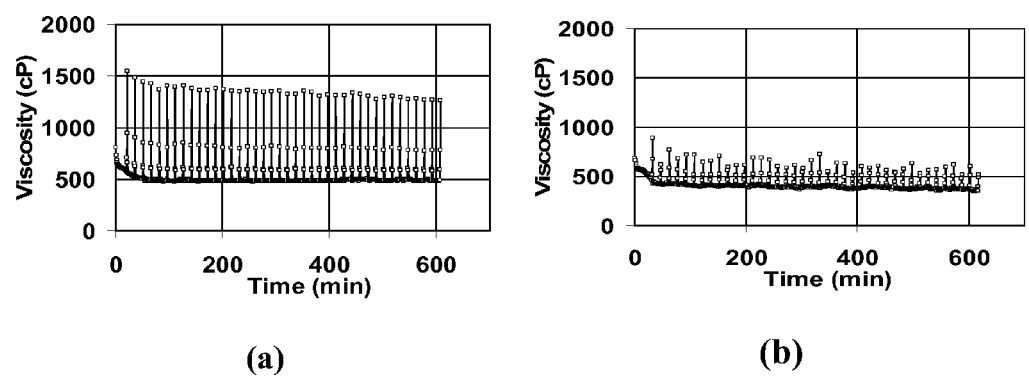
FIG. 3 shows the viscosity vs. time of the base VES fluid of FIG. 2 in another brine at two different temperatures.

A base fluid containing 6 volume % the same viscoelastic surfactant concentrate as used above was evaluated in a 1.39 kg/L (11.6 ppg) $CaCl_2$ brine at (a) 65.6° C. (150° F.) and (b) 93.3° C. (200° F.). The results are shown in FIG. 3. There was no degradation of the surfactant or of the micelles reflected as a decrease in viscosity at the lower temperature; there was a slight decrease at the higher temperature.

Figure 4:
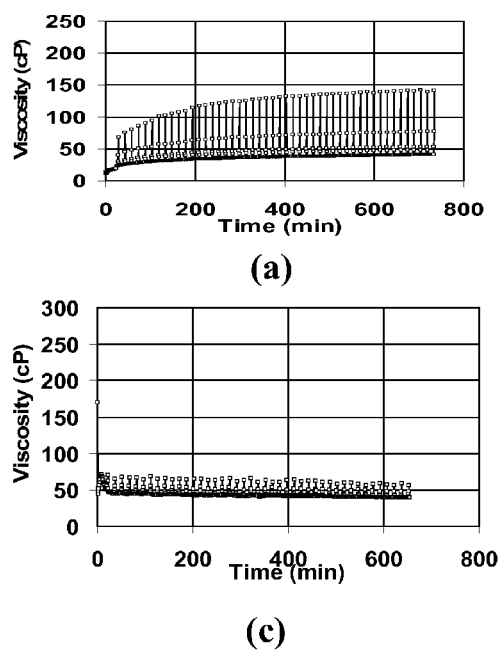
FIG. 4 shows the viscosity vs. time of a VES fluid containing ammonium persulfate at different concentrations and temperatures.
Figure 4:
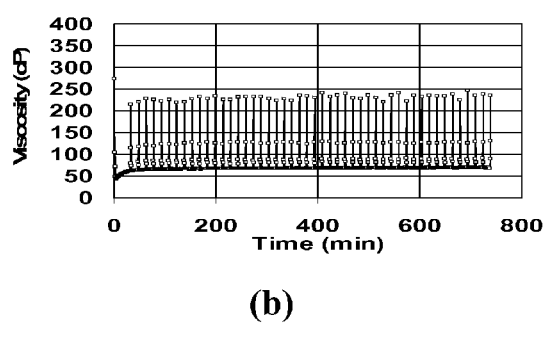

Ammonium Persulfate When 0.5 weight % ammonium persulfate was added to a VES fluid (gel) containing 4 volume % of the same viscoelastic surfactant concentrate as was used for the base fluids, 2 weight % KCl, and 1 volume % 2-butoxyethanol at ambient temperature, the fluid underwent complete phase separation. When 1 weight % ammonium persulfate was added to a similar gel, there was substantial precipitation. When the amount of ammonium persulfate was reduced to 0.2 weight %, there was minimal phase separation, but as shown in FIG. 4(a) the gel did not degrade at 65.6° C. (150° F.). When the amount of ammonium persulfate was further reduced to 0.1 weight %, FIG. 4(b) shows that there was no effect at 65.6° C. (150° F.) but FIG. 4(c) shows that at 93.3° C. (200° F.) there was a significant drop in viscosity, especially low shear viscosity, but there was no delay. Ammonium persulfate is not suitable for use as a delayed internal breaker, but may be used as a breaker if no delay is desired. Ammonium persulfate was not tested further.

Figure 5:
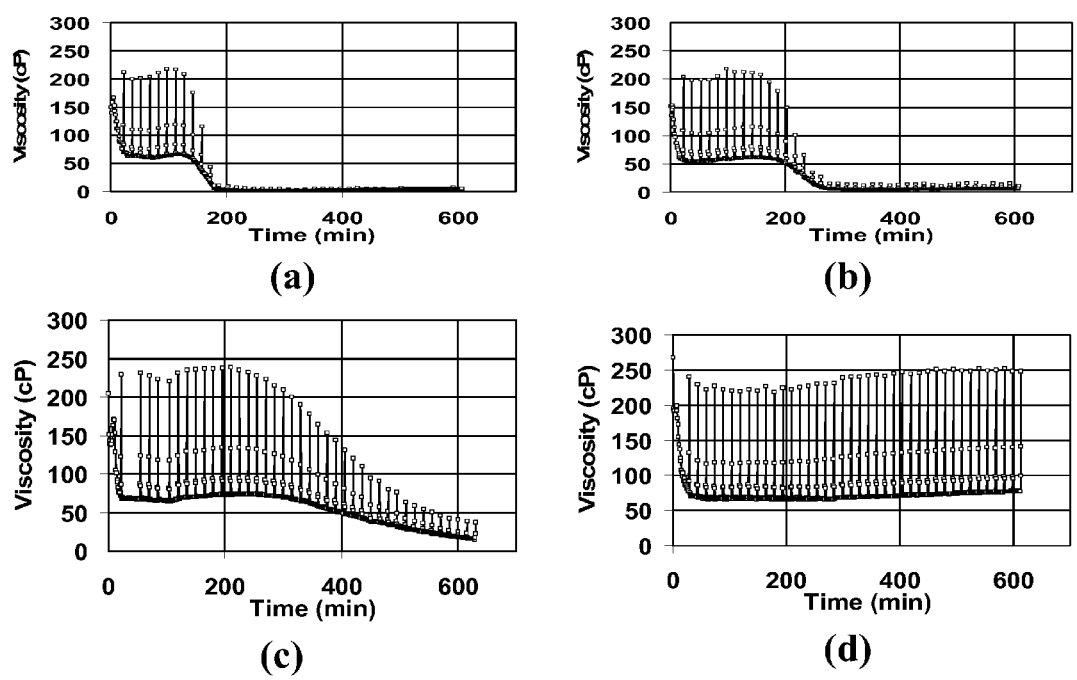
FIG. 5 shows the viscosity vs. time of a VES fluid containing sodium persulfate at different concentrations at 65.6° C. (150° F.).

Sodium Persulfate Sodium persulfate is known to provide a slower break than ammonium persulfate for polymer-based fluids. At ambient temperature, sodium persulfate did not affect the viscosity of VES gels tested at any shear rate, as demonstrated by tests (not shown) in a Bohlin viscometer over a wide range of shear rates. Tests were then run with a fluid containing 4 volume % of the same viscoelastic surfactant concentrate that was used for the base fluids, 2 weight % KCl, and 1 volume % 2-butoxyethanol at 65.6° C. (150° F.) and (a) 1 weight % sodium persulfate, (b) 0.75 weight % sodium persulfate, (c) 0.5 weight % sodium persulfate, and (d) 0.25 weight % sodium persulfate, as shown in FIG. 5.

Figure 6:
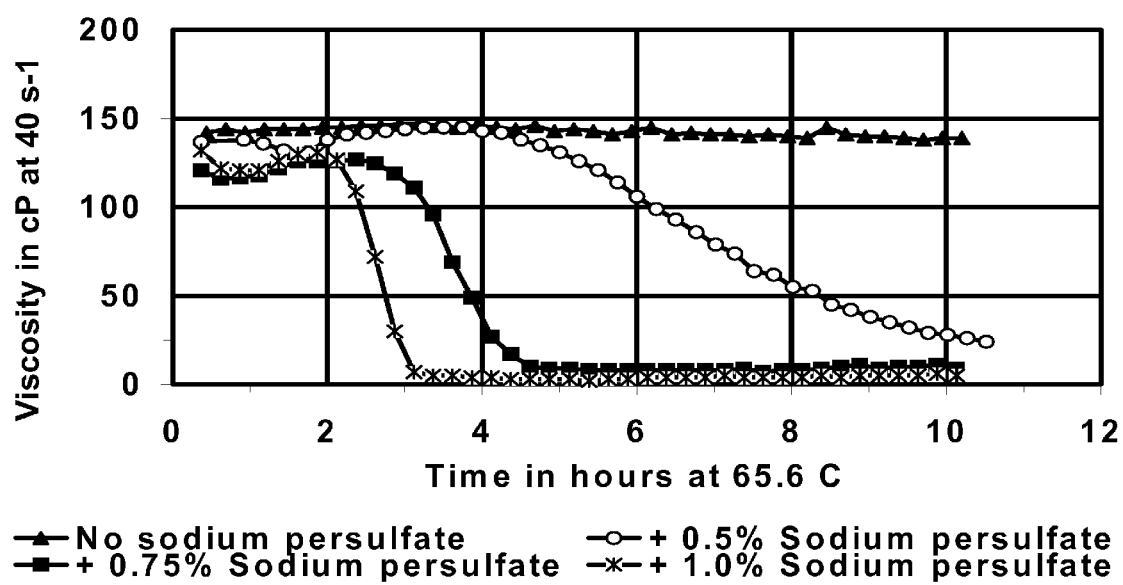
FIG. 6 shows the viscosity as a function of time at a shear rate of 40 sec$^{-1}$ of a VES fluid system with varying concentrations of sodium persulfate.

FIG. 6 shows results in cP at 40 sec$^{-1}$ shear rate with 0, 0.5, 0.75, and 1.0 weight % sodium persulfate. It can be seen that without the oxidizer as a breaker, the fluid was stable at this temperature for at least 10 hours. With 0.5 weight % sodium persulfate, the fluid started to break after about 4 hours and had lost most, but not all, of its viscosity after about 10 hours. With 0.75 weight % sodium persulfate, the fluid broke almost completely between about 3 and about 4.5 hours. With 1.0 weight % sodium persulfate, the fluid broke completely between about 2 and about 3 hours. Thus the break time was tailored by adjusting the concentration of this breaker.

Figure 7:
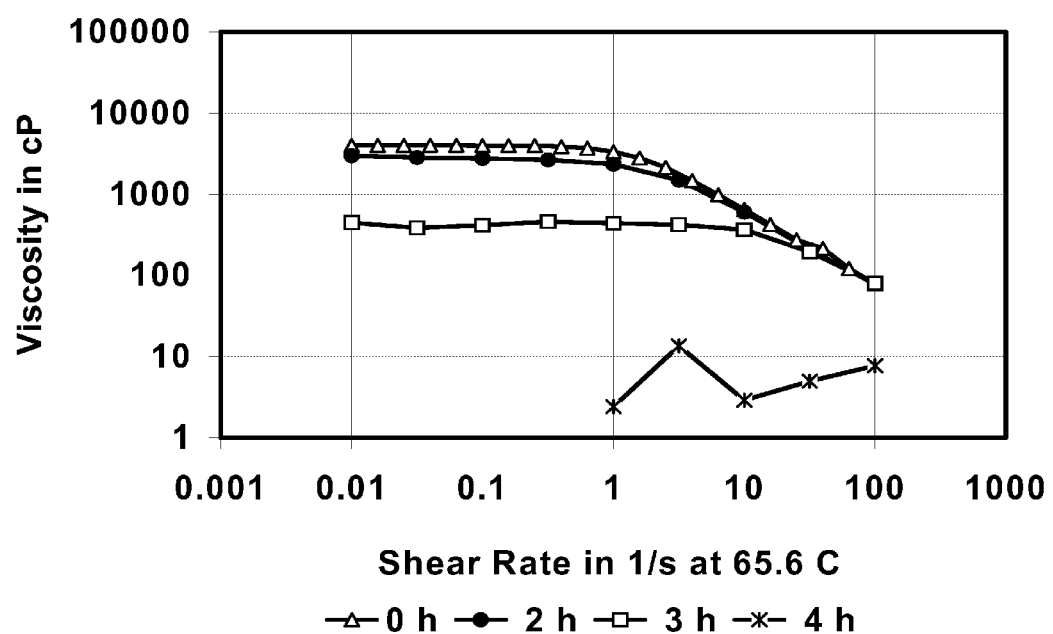
FIG. 7 shows the viscosity as a function of shear rate at low shear rates at various times at 65.6° C. (150° F.) of a VES fluid system containing sodium persulfate.

This breaker also reduced the low shear viscosity of VES fluids, which is important because this reduction can translate into lower flow initiation pressures during flowback and therefore better clean-up. FIG. 7 shows the viscosity reduction vs. time over a broad range of shear rates for a fluid containing 4 volume % of the same viscoelastic surfactant concentrate that was used for the base fluids, 2 weight % KCl, 1 volume % 2-butoxyethanol, and 0.75 weight % sodium persulfate at 65.6° C. (150° F.). The fluid showed negligible low shear viscosity reduction for 2 hours, some at three hours, and almost complete reduction of low shear viscosity after 4 hours.

Figure 8:
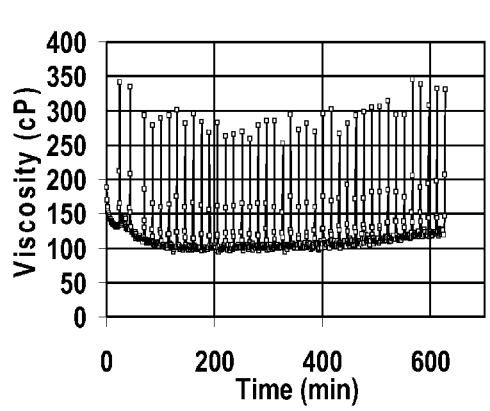
FIG. 8 shows the viscosity vs. time of a VES fluid containing sodium persulfate at different concentrations and temperatures.
Figure 8:
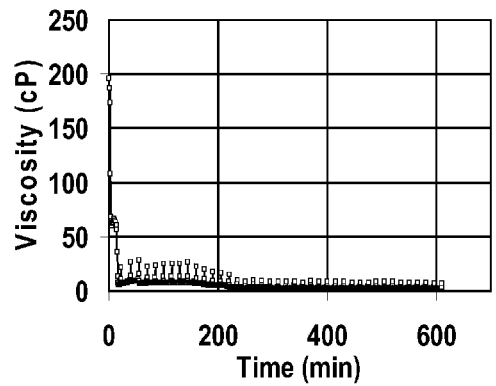
Figure 9:
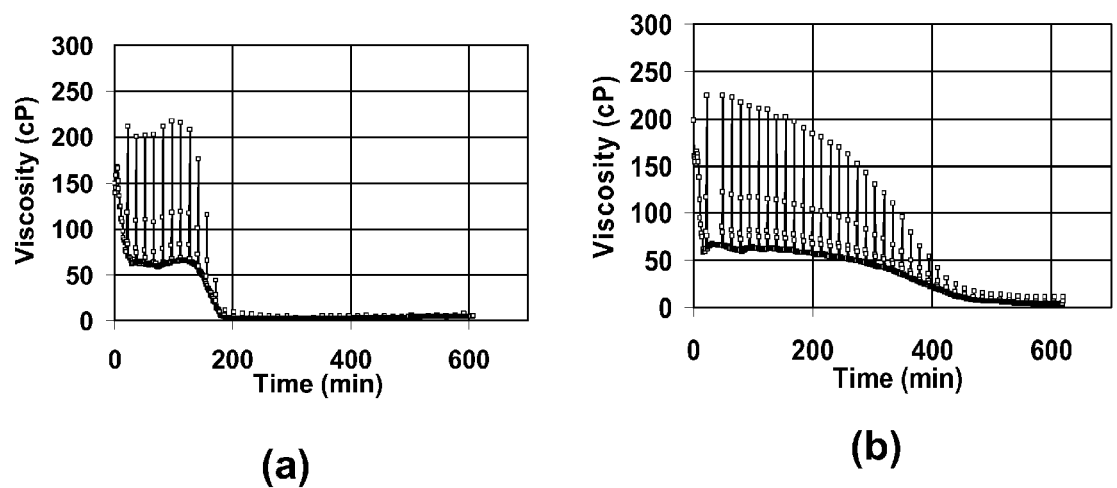
FIG. 9 shows the viscosity vs. time of a VES fluid containing sodium persulfate with and without sodium thiosulfate at different concentrations at 65.6° C. (150° F.).

In another set of experiments, the same base fluid (4 volume % of the same viscoelastic surfactant concentrate that was used for the base fluids, 2 weight % KCl, 1 volume % 2-butoxyethanol) was heated to the same temperature (65.6° C. (150° F.)) for a little over 10 hours in a Fann 50 at a shear rate of 100 sec$^{-1}$ between ramps. FIG. 8(*a*) shows that the fluid was stable at 37.8° C. (100° F.) for over 10 hours, even with 5 weight % sodium persulfate. On the other hand, FIG. 8(*b*) shows that the fluid had degraded by the time the final temperature was reached when it was heated to 93.3° C. (200° F.) with 1 weight % sodium persulfate. FIG. 9(*a*) shows that with 1 weight % sodium persulfate the fluid degraded after 2 to 3 hours at 65.6° C. (150° F.), but FIG. 9(*b*) shows that with 1 weight % sodium persulfate and 2 weight % of the common oxygen scavenger sodium thiosulfate as a stabilizer (delay agent) the fluid began to degrade after about 4 hours and did not fully degrade until about 8 hours. Thus the stability and the delay can be adjusted by a combination of an oxidizing agent and an oxygen scavenger.

Figure 10:
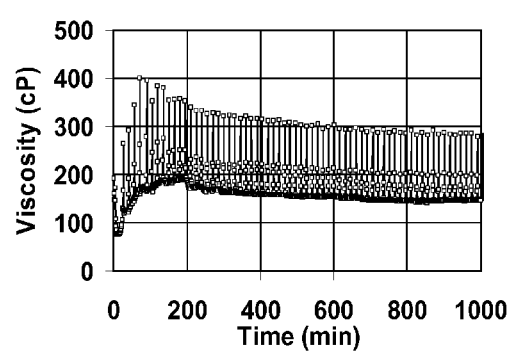
FIG. 10 shows the viscosity vs. time of a VES fluid containing sodium persulfate at different pH's at 65.6° C. (150° F.)
Figure 10:
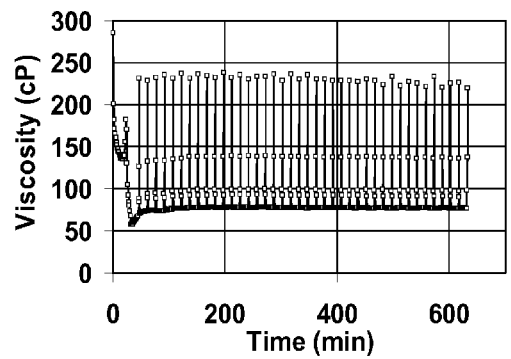

The break was also delayed by the addition of base. FIG. 10(*a*) shows a fluid made with 4 volume % of the same viscoelastic surfactant concentrate that was used for the base fluids, 2 weight % KCl, and 1 volume % 2-butoxyethanol heated to 65.6° C. (150° F.) with 1 weight % sodium persulfate and 1 weight % sodium carbonate. The figure shows the first 16 hours; the fluid was actually completely stable for at least 50 hours. FIG. 10(*b*) shows a fluid made with 4 volume % of the same viscoelastic surfactant concentrate that was used for the base fluids, 2 weight % KCl, and 1 volume % 2-butoxyethanol heated to 65.6° C. (150° F.) with 1 weight % sodium persulfate and 0.3 volume % tetraethylenepentamine. The figure shows the first 10 hours; it actually took 7 days for the fluid to degrade. These bases provided excellent delay of the break.

Figure 11:
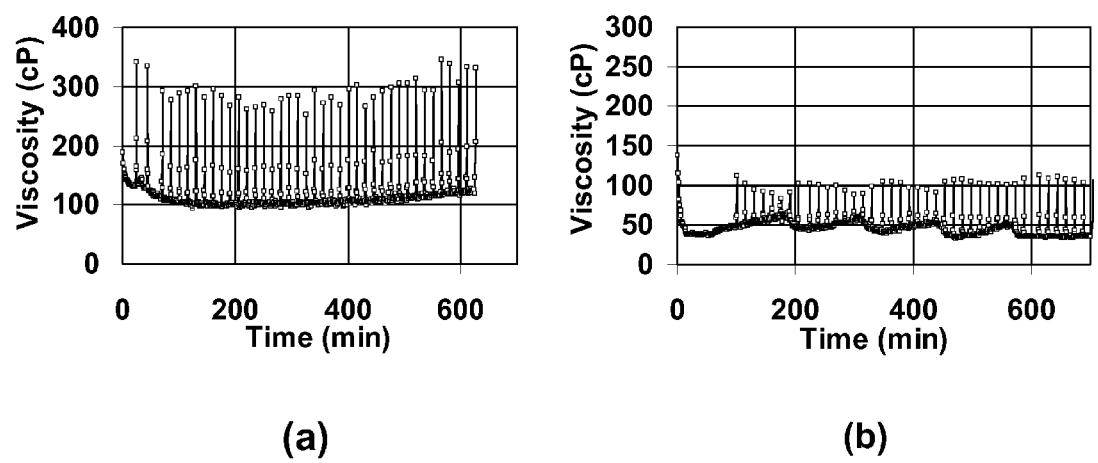
FIG. 11 shows the viscosity vs. time of a VES fluid containing sodium persulfate with and without ferrous sulfate heptahydrate at 37.8° C. (100° F.).

A catalyst for the break was also examined. Ferrous sulfate is often used as a low temperature breaker aid for oxidizer breakers for polymer based fluids. A fluid made with 4 volume % the same viscoelastic surfactant concentrate that was used for the base fluids, 2 weight % KCl, and 1 volume % 2-butoxyethanol was stable for over 10 hours at 37.8° C. (100° F.) when it contained 5 weight % sodium persulfate (FIG. 11(*a*)). However, FIG. 11(*b*) shows that the same fluid at that temperature with only 1 weight % sodium persulfate and 0.05 weight % ferrous sulfate had a much reduced viscosity almost immediately.

Figure 12:
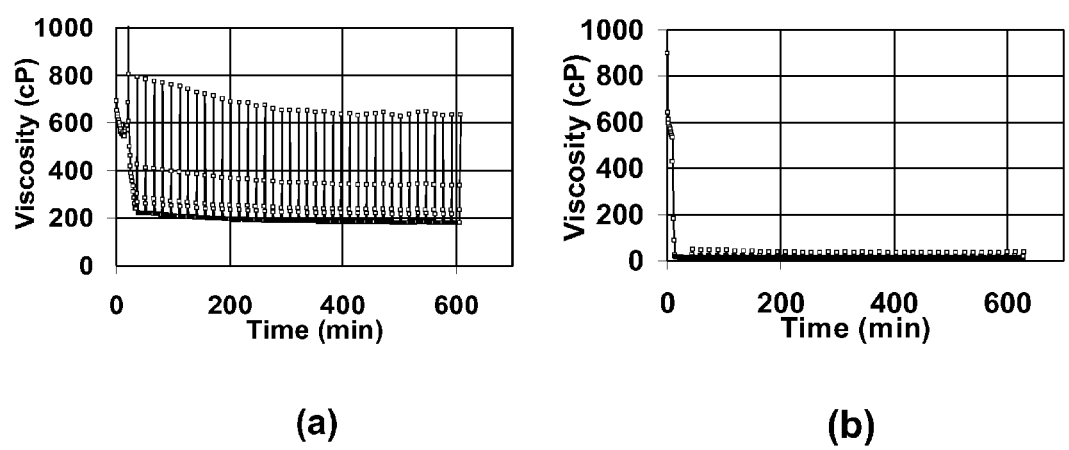
FIG. 12 shows the viscosity vs. time of a VES fluid containing sodium persulfate in a calcium chloride brine at 65.6° C. (150° F.) and 93.3° C. (200° F.).
Figure 13:
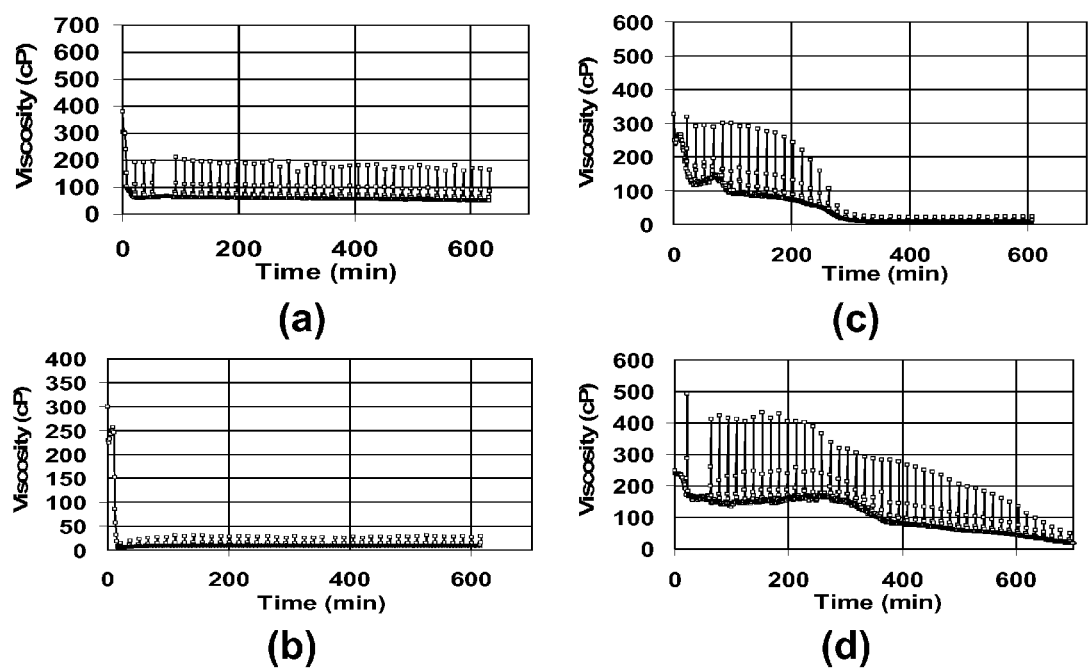
FIG. 13 shows the viscosity vs. time of a VES fluid containing varying amounts of sodium persulfate with and without varying amounts of sodium thiosulfate in a sodium bromide brine at 65.6° C. (150° F.).

In heavy brines, sodium persulfate was not as active as in 2% KCl. FIG. 12(*a*) shows that a fluid made with 6 volume % the same viscoelastic surfactant concentrate as was used for the base fluids in a 1.39 kg/L (11.6 ppg) calcium chloride brine containing 1.1 weight % sodium persulfate showed a stable 200 cP viscosity at 100 sec$^{-1}$ for at least 10 hours at 65.6° C. (150° F.). This is about 50% of the viscosity of the base gel (see FIG. 3(*b*)), and this viscosity was obtained immediately, that is, with no delay apparent. However, when heating to 93.3° C. (200° F.) was attempted, as shown in FIG. 12(*b*), this fluid broke completely before it could reach that temperature; again, there was no delay. In sodium bromide brine, the performance of sodium persulfate breaker was similar to its performance in calcium chloride brine. Surprisingly, though, sodium thiosulfate did not consistently, effectively, retard the break. FIG. 13 shows a fluid made with 6 volume % the same viscoelastic surfactant concentrate as was used for the base fluids in a 1.39 kg/L (11.6 ppg) sodium bromide brine containing (a) 1.1 weight % sodium persulfate, (b) 1.1 weight % sodium persulfate and 1.0 weight % sodium thiosulfate, (c) 1.1 weight % sodium persulfate and 2.0 weight % sodium thiosulfate, and (d) 0.5 weight % sodium persulfate and 1.0 weight % sodium thiosulfate. There was no retardation (and low viscosities) in (a) and (b) with (b) unexpectedly being the worst and appearing to show sodium thiosulfate assisting the break, some improvement in (c), and the highest viscosity and most retarded break in (d). It appeared to be necessary to have a significant excess of sodium thiosulfate over sodium persulfate to achieve high viscosities and retarded breaks. This behavior shows that systems containing VES's, brines, oxidizing breakers, and retarders should be tested at the intended job temperature before use.

Figure 14:
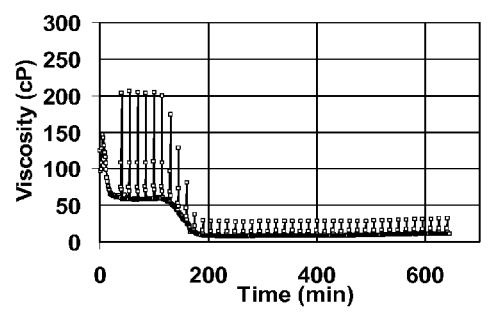
FIG. 14 shows the viscosity vs. time of a VES fluid containing potassium persulfate at different concentrations at 65.6° C. (150° F.).
Figure 14:
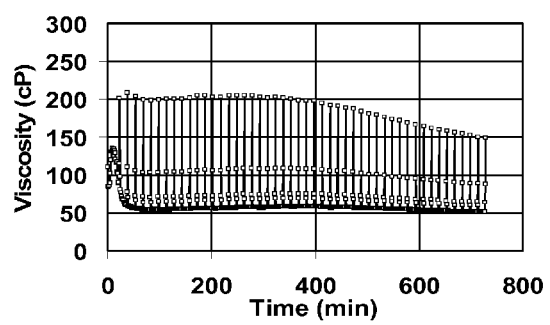
Figure 14:
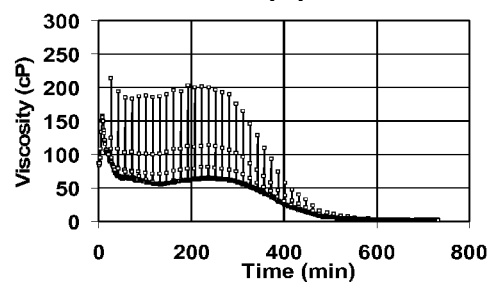
Figure 15:
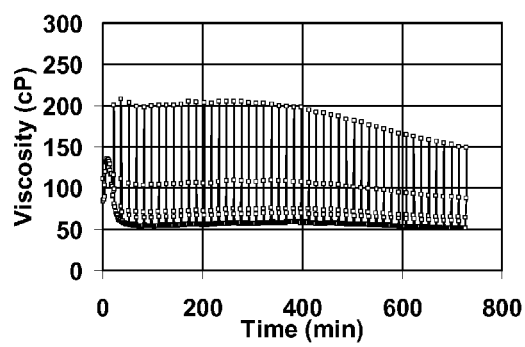
FIG. 15 shows the viscosity vs. time of a VES fluid containing potassium persulfate at 65.6° C. (150° F.) and 93.3° C. (200° F.).
Figure 15:
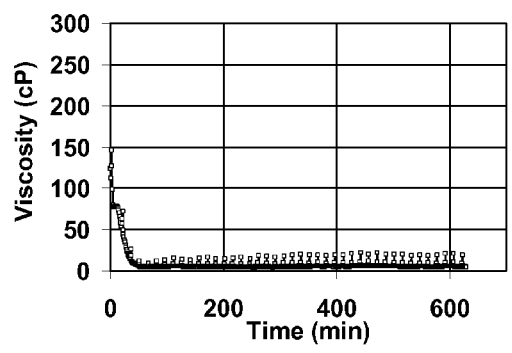
Figure 16:
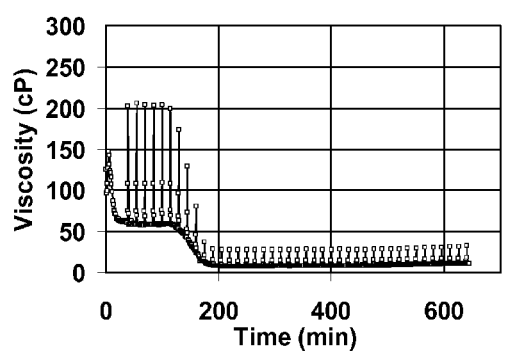
FIG. 16 shows the viscosity vs. time of a VES fluid containing potassium persulfate with and without sodium thiosulfate at 65.6° C. (150° F.).
Figure 16:
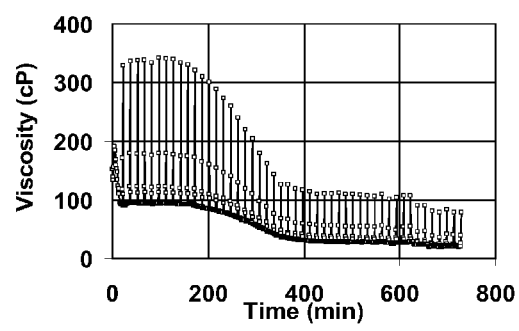
Figure 17:
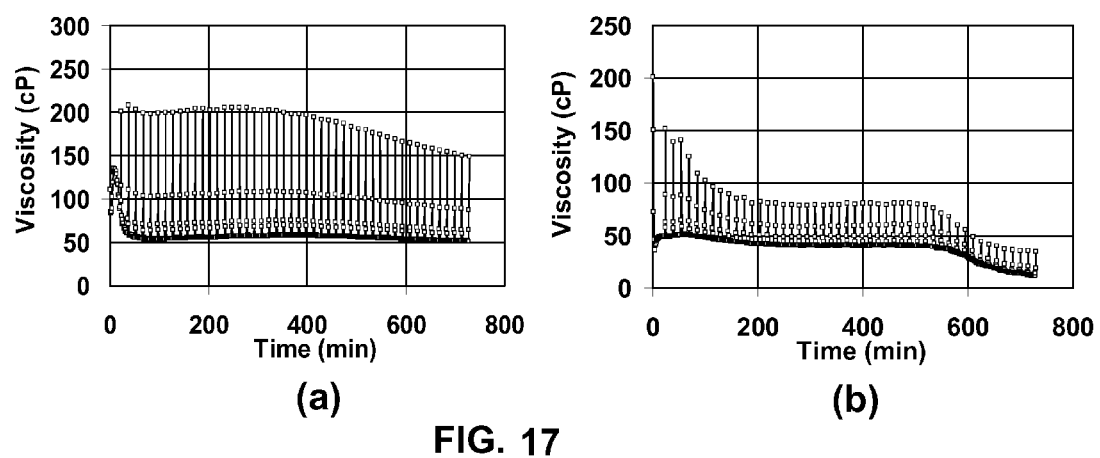
FIG. 17 shows the viscosity vs. time of a VES fluid containing potassium persulfate with and without ferrous sulfate heptahydrate at 65.6° C. (150° F.).

Potassium persulfate This breaker's behavior was similar to that of sodium persulfate, although it was less active at lower concentrations. A controlled delayed break can be achieved. FIG. 14 shows the viscosity vs. time for a fluid made with 4 volume % the same viscoelastic surfactant concentrate as was used for the base fluids, 2 weight % KCl, and 1 volume % 2-butoxyethanol containing 1 weight % potassium persulfate, (b) 0.75 weight % potassium persulfate, and (c) 0.5 weight % potassium persulfate at 65.6° C. (150° F.). With 1 weight % potassium persulfate there was a sharp break after about 2 hours; with 0.75 weight % there was a gradual break between about 6 hours and about 7 hours; with 0.5 weight % there was no break after 12 hours. FIGS. 15(*a*) and (*b*) shows that with the same fluid and 0.5 weight % potassium persulfate, the break was very fast at 93.3° C. (200° F.). Sodium thiosulfate acted as a break retarder. FIGS. 16(*a*) and (*b*) shows the same fluid with 1 weight % potassium persulfate at 65.6° C. (150° F.) with and without 2 weight % sodium thiosulfate. The additive increased the viscosity slightly and approximately doubled the time before the break. FIGS. 17(a) and (b) shows that ferrous sulfate accelerates the break. With the same fluid and 0.5 weight % potassium persulfate at 65.6° C. (150° F.) and 0.05 weight % ferrous sulfate heptahydrate, the break began after about 9 hours while there was no break after 12 hours without the accelerator.

Figure 18:
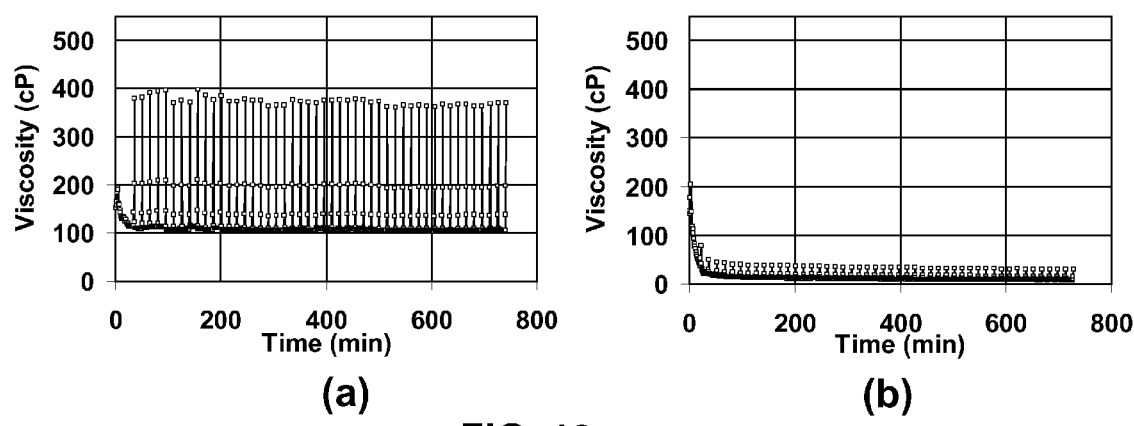
FIG. 18 shows the viscosity vs. time of a VES fluid containing potassium persulfate in a sodium bromide brine at 65.6° C. (150° F.) and 93.3° C. (200° F.).
Figure 19:
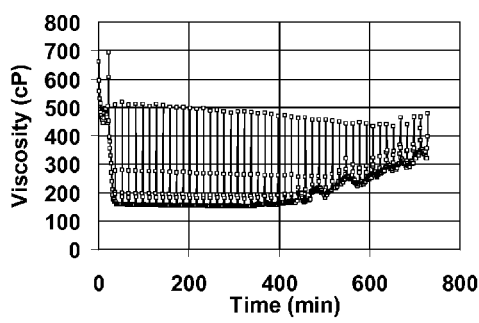
FIG. 19 shows the viscosity vs. time of a VES fluid containing potassium persulfate in a calcium chloride brine at 65.6° C. (150° F.) and 93.3° C. (200° F.).
Figure 19:
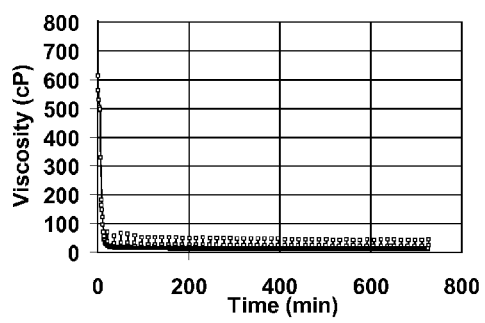

Breaking in heavy brines was difficult to control with potassium persulfate. FIG. 18 shows results with a fluid made with 6 volume % the same viscoelastic surfactant concentrate as was used for the base fluids in a 1.50 kg/L (12.5 ppg) sodium bromide brine at (a) 65.6° C. (150° F.) and (b) 93.3° C. (200° F.). At the lower temperature, the initial viscosity was reduced by about 50% by the oxidizer, but it didn't cause a break for over 12 hours; at the higher temperature, a complete break occurred before the temperature could be reached. Similar results were obtained in a fluid made with 6 volume % the same viscoelastic surfactant concentrate as was used for the base fluids in a 1.39 kg/L (11.6 ppg) calcium chloride brine at (a) 65.6° C. (150° F.) and (b) 93.3° C. (200° F.) as shown in FIG. 19.

Figure 20:
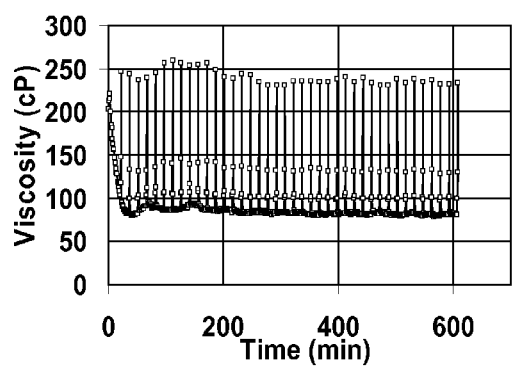
FIG. 20 shows the viscosity vs. time of a VES fluid containing sodium bromate at 65.6° C. (150° F.) and 93.3° C. (200° F.).
Figure 20:
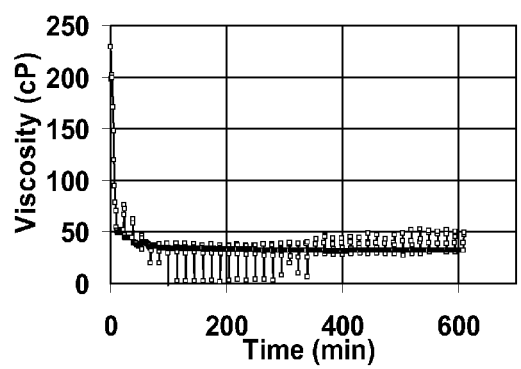
Figure 21:
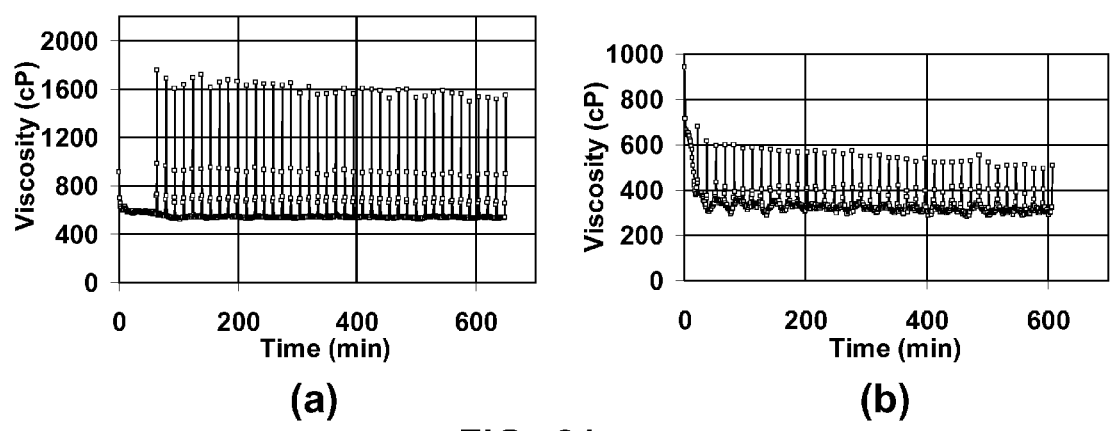
FIG. 21 shows the viscosity vs. time of a VES fluid containing sodium bromate in a calcium chloride brine at 65.6° C. (150° F.) and 93.3° C. (200° F.).

Sodium Bromate This oxidizer is widely used as a high temperature breaker for polymer based systems. FIG. 20 shows the viscosity vs. time for a fluid made with 4 volume % the same viscoelastic surfactant concentrate as was used for the base fluids, 2 weight % KCl, and 1 volume % 2-butoxyethanol containing 0.5 weight % sodium bromate at (a) 65.6° C. (150° F.) and (b) 93.3° C. (200° F.). At the lower temperature there was no viscosity reduction and no break. At the higher temperature, there was a substantial decrease in viscosity, especially at low shear rates, but there was no delay. FIG. 21 shows the viscosity vs. time for a fluid made with 6 volume % the same viscoelastic surfactant concentrate as was used for the base fluids and 1 weight % sodium bromate in a 1.39 kg/L (11.6 ppg) calcium chloride brine at (a) 65.6° C. (150° F.) and (b) 93.3° C. (200° F.). There was no break after more than 10 hours at the lower temperature; there was about a 50% reduction in viscosity at the higher temperature, without any delay, and the viscosity was then maintained for at least 10 hours. Sodium bromate was not very effective in these experiments, but it is believed that it would be suitable when used with accelerators and retarders.

Figure 22:
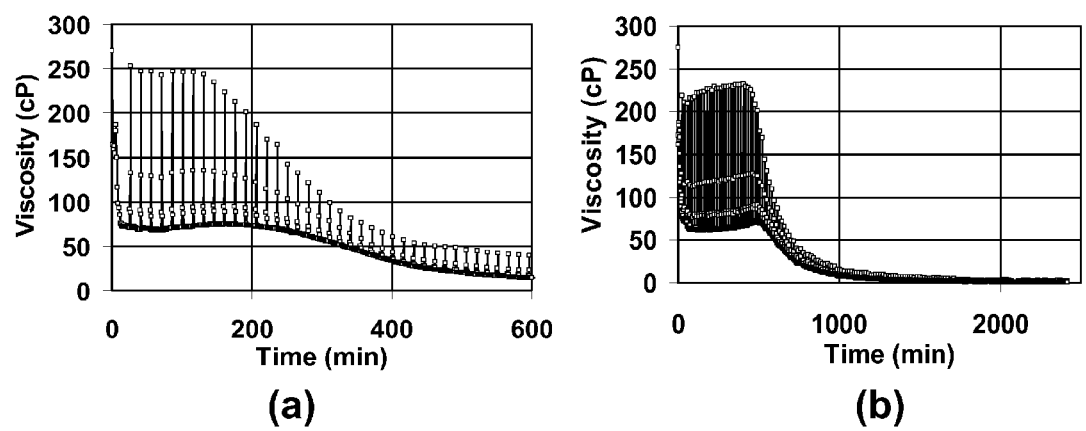
FIG. 22 shows the viscosity vs. time of a VES fluid containing varying amounts of hydrogen peroxide at 65.6° C. (150° F.).
Figure 23:
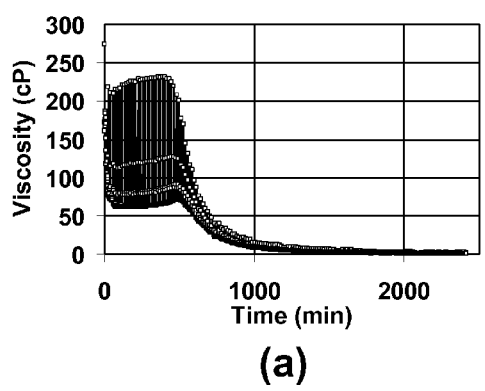
FIG. 23 shows the viscosity vs. time of a VES fluid containing hydrogen peroxide at 65.6° C. (150° F.) and 79.4° C. (175° F.).
Figure 23:
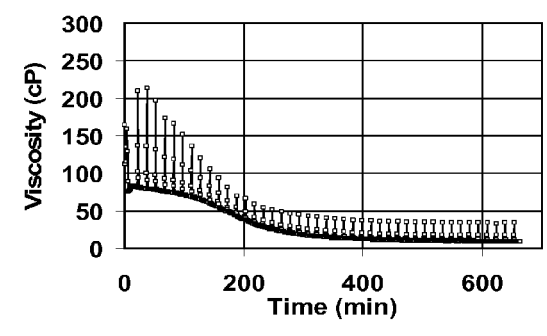

Hydrogen peroxide This oxidizing agent was obtained as a 30 weight % solution in water. FIG. 22 shows the viscosity vs. time for a fluid made with 4 volume % the same viscoelastic surfactant concentrate as was used for the base fluids, 2 weight % KCl, and 1 volume % 2-butoxyethanol containing (a) 1.5 weight % (active ingredient) hydrogen peroxide, and (b) 0.3 weight % hydrogen peroxide at 65.6° C. (150° F.). With the higher concentration, a gradual break began after about 4 hours; with the lower concentration, a gradual break began after about 8 hours. FIG. 23 shows the results with a fluid made with 4 volume % the same viscoelastic surfactant concentrate as was used for the base fluids, 2 weight % KCl, and 1 volume % 2-butoxyethanol containing 0.3 weight % hydrogen peroxide at (a) 65.6° C. (150° F.) and (b) 79.4° C. (175° F.). At the higher temperature, there was almost no delay, but the break was slow and the fluid could have been useful.

Figure 24:
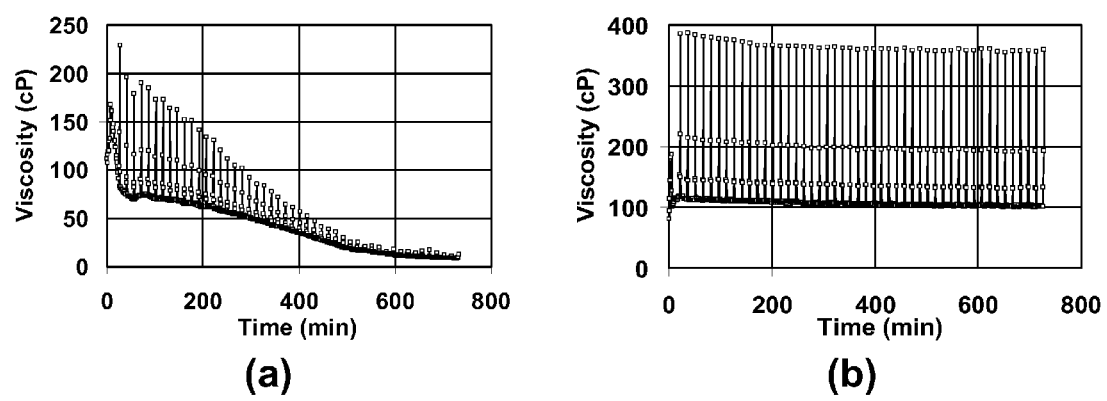
FIG. 24 shows the viscosity vs. time of a VES fluid containing hydrogen peroxide in a sodium bromide brine at 65.6° C. (150° F.) and 93.3° C. (200° F.).
Figure 25:
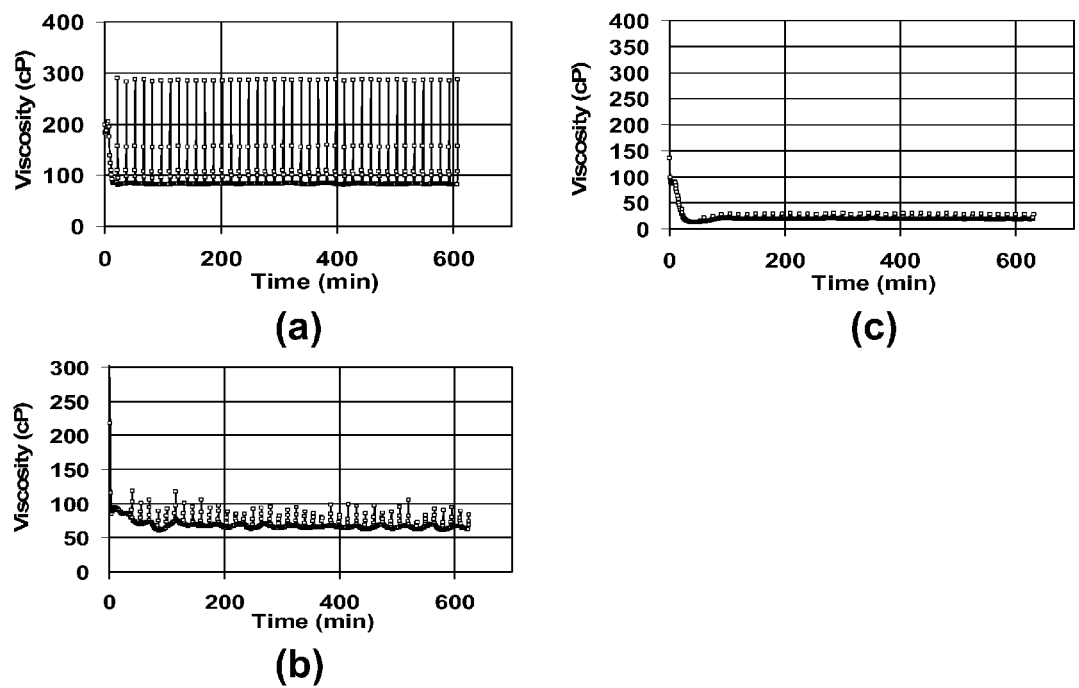
FIG. 25 shows the viscosity vs. time of a VES fluid containing varying amounts of t-butylhydroperoxide at 65.6° C. (150° F.).
Figure 26:
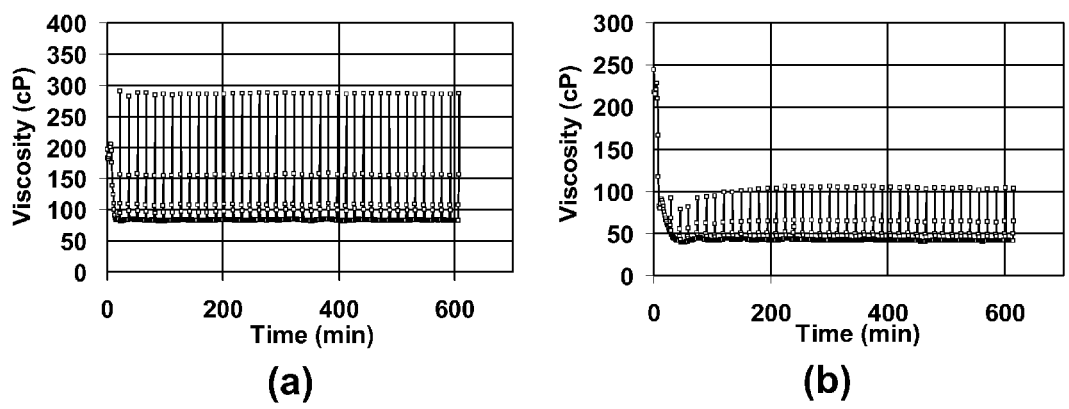
FIG. 26 shows the viscosity vs. time of a VES fluid containing t-butylhydroperoxide at 65.6° C. (150° F.) and 93.3° C. (200° F.).

FIG. 24 shows the results with a fluid made with 6 volume % the same viscoelastic surfactant concentrate as was used for the base fluids in a 1.50 kg/L (12.5 ppg) sodium bromide brine containing 0.3 weight % hydrogen peroxide at (a) 65.6° C. (150° F.) and (b) 93.3° C. (200° F.). At the lower temperature there was a gradual break; at the higher temperature, the fluid was stable. At ambient temperature, the fluid was stable (data not shown). These three experiments were done in duplicate and the results were confirmed. When hydrogen peroxide was added to a 1.39 kg/L (11.6 ppg) calcium chloride brine, it reacted immediately, with evolution of a gas, and the system was not evaluated further.

t-butylhydroperoxide This is a versatile oxidizer in many chemical reactions. The material was used as a 70 weight % solution in water. FIG. 25 shows the viscosity vs. time for a fluid made with 4 volume % the same viscoelastic surfactant concentrate as was used for the base fluids, 2 weight % KCl, and 1 volume % 2-butoxyethanol containing (a) 0.7 weight % t-butylhydroperoxide (concentration of active ingredient), (b) 1.4 weight % t-butylhydroperoxide, and (c) 3.5 weight % t-butylhydroperoxide at 65.6° C. (150° F.). It can be seen that at the lowest concentration there was no effect on the viscosity; at the middle concentration, there was a reduction in viscosity, but no delay; at the highest concentration there was an immediate break during the heating phase. Using a lower concentration at a higher temperature did not result in delay. FIG. 26 shows the same fluid with 0.7 weight % t-butylhydroperoxide at (a) 65.6° C. (150° F.) and (b) 93.3° C. (200° F.). There was no effect at the lower temperature; at the higher temperature there was almost no viscosity reduction at 100 sec$^{-1}$ and some reduction at lower shear rates but there was no delay.

Figure 27:
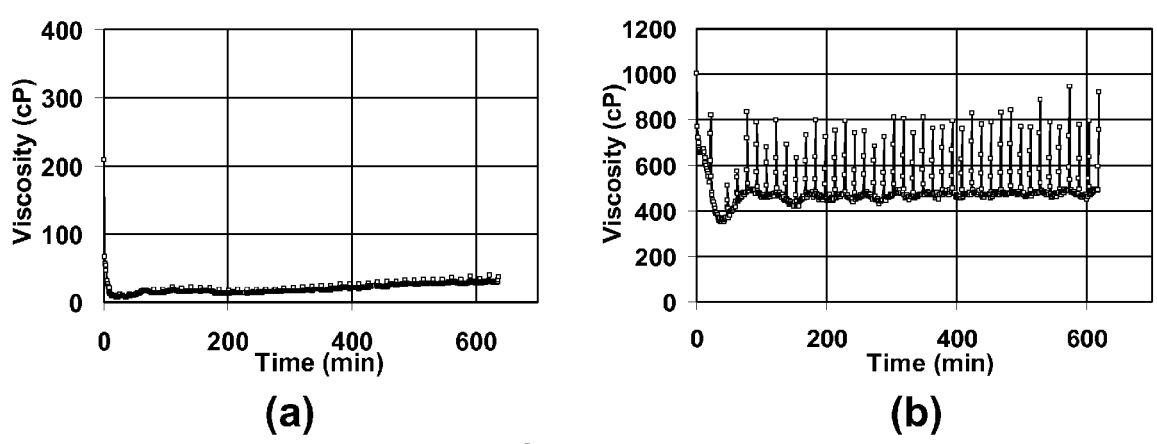
FIG. 27 shows the viscosity vs. time of a VES fluid containing varying amounts of t-butylhydroperoxide in a calcium chloride brine at 65.6° C. (150° F.).
Figure 28:
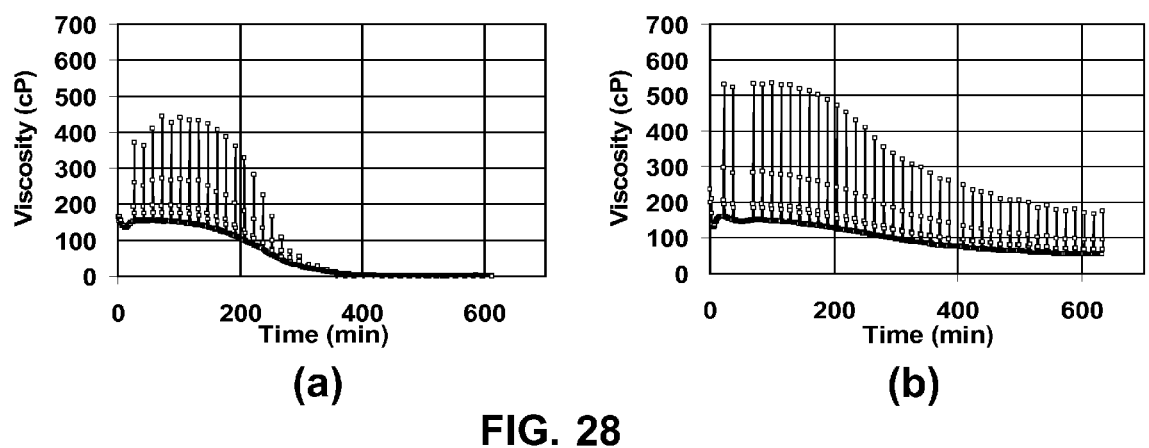
FIG. 28 shows the viscosity vs. time of a VES fluid containing varying amounts of t-butylhydroperoxide in a sodium bromide brine at 65.6° C. (150° F.).

As opposed to hydrogen peroxide, t-butylhydroperoxide was found to be compatible with calcium chloride brine at ambient temperature. FIG. 27 shows the viscosity vs. time for a fluid made with 6 volume % the same viscoelastic surfactant concentrate as was used for the base fluids in a 1.39 kg/L (11.6 ppg) calcium chloride brine at 65.6° C. (150° F.) containing (a) 1.4 weight % (active ingredient) or (b) 0.7 weight % t-butylhydroperoxide. A complete break occurred immediately (during heating) with 1.4 weight % while 0.7 weight % had almost no effect. FIG. 28 shows the viscosity vs. time for a fluid made with 6 volume % the same viscoelastic surfactant concentrate as was used for the base fluids in a 1.39 kg/L (11.6 ppg) sodium bromide brine at 65.6° C. (150° F.) containing (a) 1.4 weight % (active ingredient) or (b) 0.7 weight % t-butylhydroperoxide. A delayed break was observed after about 3 hours at the higher concentration and gradually starting at about 3 hours but not complete after about 10 hours at the lower concentration. Not shown is that with 0.5 weight % t-butylhydroperoxide the delay was about the same and the break was even slower. This oxidizing agent is suitable in sodium bromide brine.

Figure 29:
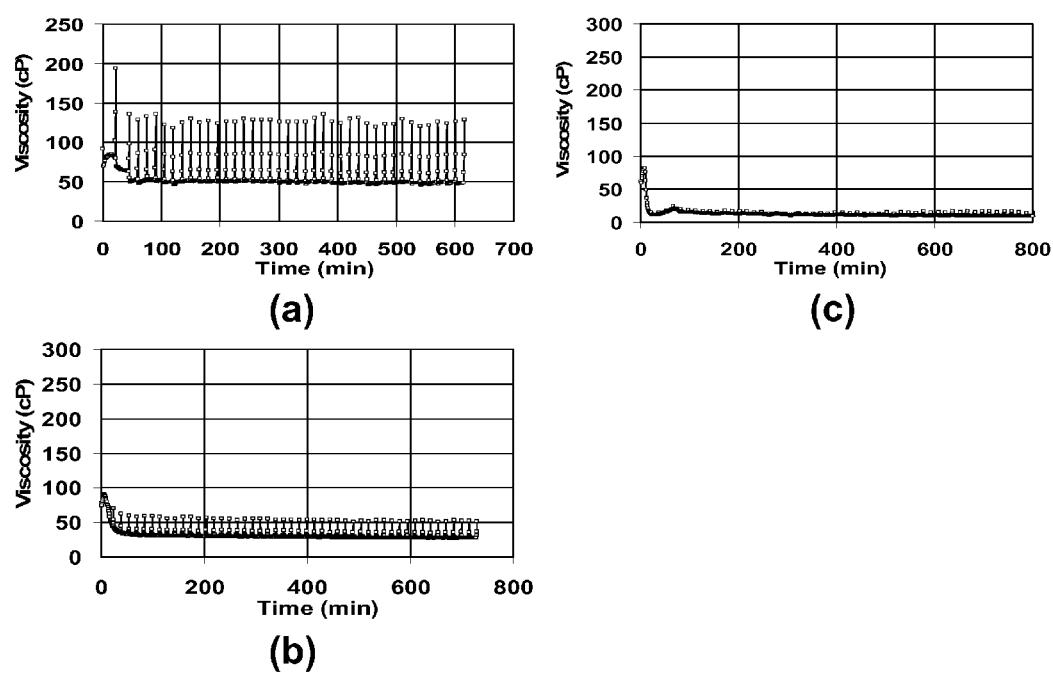
FIG. 29 shows the viscosity vs. time of a VES fluid containing varying amounts of oxone tertabutylammonium salt in a sodium bromide brine at 65.6° C. (150° F.).
Figure 30:
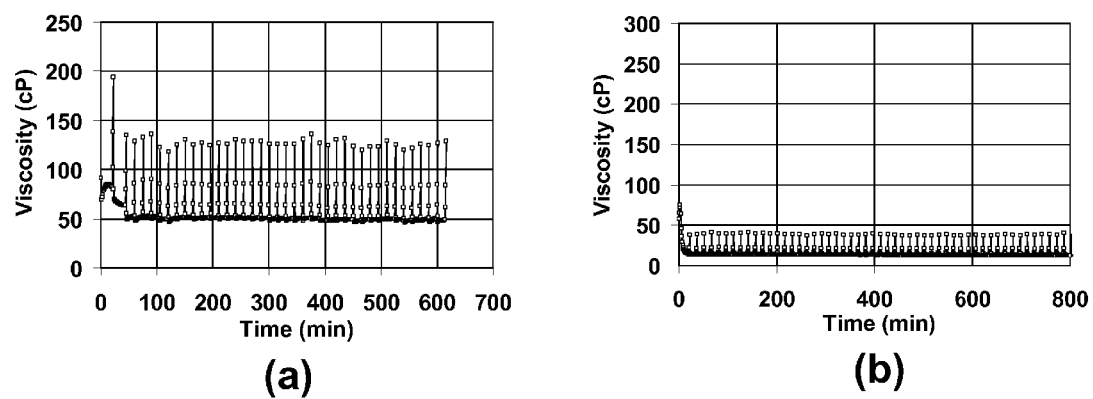
FIG. 30 shows the viscosity vs. time of a VES fluid containing oxone tertabutylammonium salt at 65.6° C. (150° F.) and 93.3° C. (200° F.).

Oxone tetrabutylammonium salt ($Bu_4NHSO_5$) (Also known as tetrabutylammonium persulfate triple salt.) FIG. 29 shows the viscosity vs. time for a fluid made with 6 volume % the same viscoelastic surfactant concentrate as was used for the base fluids in a 1.39 kg/L (11.6 ppg) sodium bromide brine at 65.6° C. (150° F.) containing (a) 0.5 weight % oxone tetrabutylammonium salt, (b) 0.75 weight % oxone tetrabutylammonium salt, or (c) 1.0 weight % oxone tetrabutylammonium salt. It can be seen that the lowest concentration reduced the viscosity a little, the middle concentration reduced it substantially, and the highest concentration reduced it almost completely during the heating stage. There was no delay. FIG. 30 shows the viscosity vs. time for a fluid made with 6 volume % the same viscoelastic surfactant concentrate as was used for the base fluids in a 1.39 kg/L (11.6 ppg) sodium bromide brine containing 0.5 weight % oxone tetrabutylammonium salt at (a) 65.6° C. (150° F.) and (b) 93.3° C. (200° F.). There was an almost complete viscosity reduction at the higher temperature during the heat-up, again with no delay. A potential advantage to using oxone tetrabutylammonium salt, hydrogen peroxide, or t-butylhydroperoxide as a breaker is that the broken fluid was one phase in the experiments done (although it is not known that this would be so in all brines). Two-phase broken fluids were observed when persulfates were used. Single-phase broken fluids may flow more easily through porous media and therefore may clean up more easily. However, oxone tetrabutylammonium salt appeared to be reactive with heavier brines. When it was added to a heavy sodium bromide brine, a yellow precipitate formed immediately at ambient temperature. When it was added to a heavy calcium chloride brine, the fluid turned cloudy at ambient temperature.

It should be understood that only a few examples have been shown for the use of tested oxidizers with a specific VES, at specific concentrations, in specific brines, at specific temperatures, and with or without specific accelerators and retarders at specific concentrations. The fact that a specific oxidizer was observed to be suitable or not in a specific case should not be taken as being a general conclusion for that oxidizer. It is believed that all oxidizers will be suitable under certain conditions. As usual, laboratory testing should be done to determine the optimal use parameters for each oxidizer in each fluid at each condition.

Figure 31:
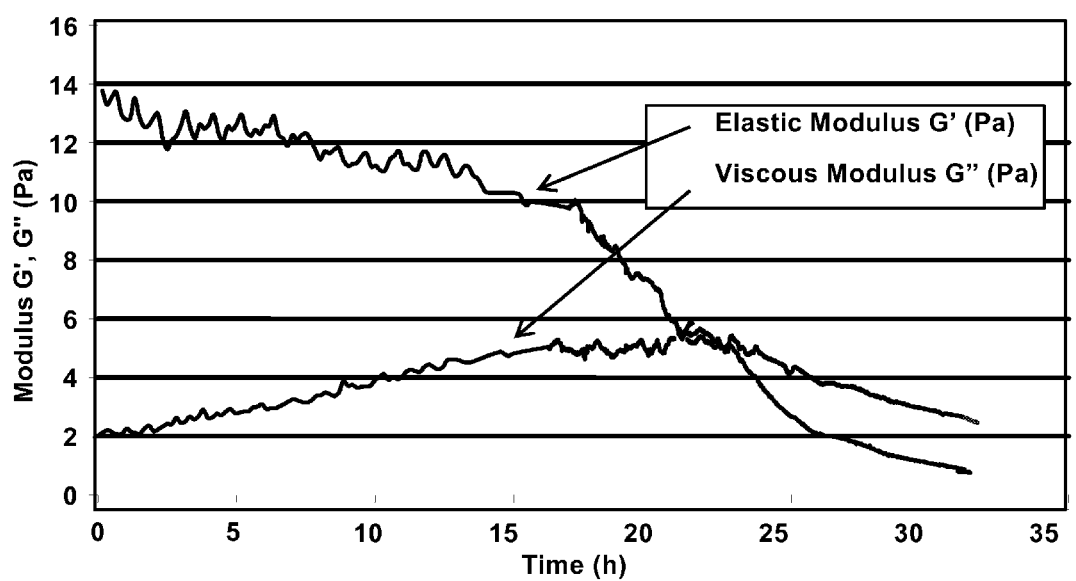
FIG. 31 shows the dynamic rheology of a fluid subjected to the enhanced oxidative destabilization of the Invention for one day.

Enhanced Oxidative Destabilization A concentrate was made by mixing about 2 weight % glycerol, about 15 weight % propane-1,2-diol, about 4 weight % sodium chloride, about 43 weight % water, about 28 weight % oleoylamidopropyl dimethyl betaine, about 3 weight % sodium dodecylbenzene sulfonate, and about 5 weight % dipropylene glycol methyl ether in a Waring blender. A 20 ml portion of this concentrate and 0.2 ml of a corrosion inhibitor were added to 200 mL of a 1.44 kg/L (12 ppg (pounds per gallon)) $CaBr_2$ brine and the mixture was stirred with a Variac set to 20% of the full span for 5 minutes, then 30% for 5 minutes, then 60% for 40 seconds. The fluid dynamic rheology was measured with a Bohlin Rheometer using a bob and cup geometry at 1 Hz for 33 hours at 26.7° C. (80° F.); the fluid was not degassed before being put in the Rheometer. FIG. 31 shows the results. The viscous modulus (G") did not change very much during this aging process, but the elastic modulus (G') (which indicates a fluid's ability to transport proppant or gravel) decreased substantially, and the two crossed at about 5 Pa after about 22 hours. Not to be limited by theory, but it is believed that the decrease in G' is due to oxidation caused by air in the fluid. Experiments showed that if the fluid was foamed by very vigorous blending with high Variac settings, the higher the foam quality (with air) the faster the decrease in G'. If the fluid was centrifuged after blending to remove all foam cells and bubbles, there was no decrease in G' after several days.

Figure 32:
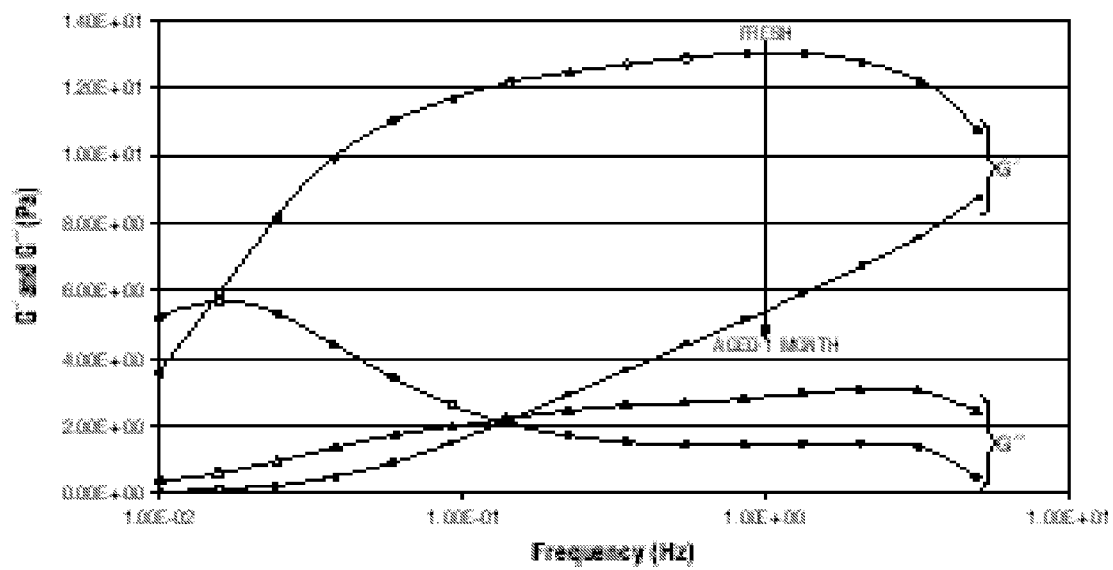
FIG. 32 shows the dynamic rheology of the same fluid as in FIG. 31 subjected to the enhanced oxidative destabilization of the Invention for one day and one month.

A fluid identical to that shown in FIG. 31 was prepared in the same way, and stored for one month at 26.7° C. (80° F.). The viscous and elastic moduli were measured for the fresh fluid and for the aged fluid as a function of frequency. The results are shown in FIG. 32. It can be seen that the value of G' (the elastic modulus) decreased substantially over the month at all frequencies examined. On the other hand, the value of G" (the viscous modulus) increased, but did not change nearly as substantially over the month. These results indicate that the fluid was becoming less elastic as it aged. Furthermore, the crossover frequency increased during the month. Not shown is that the change in each modulus was gradual over the entire month.

The same types of experiments as those shown in FIGS. 31 and 32 were performed on similar systems. Since the appearance of the results was very similar to FIGS. 31 and 32, the data are not shown. It was found that samples aged under $N_2$ at 1000 psi pressure (6.89 MPa) showed a slower decrease in G'; not to be limited by theory, but this may be because carbon dioxide is generated in the process and higher pressure slows a reaction in which gas is produced. It was also found that the higher the temperature, the faster the decrease in G'. Furthermore, when bromide brine was not present, the decrease in G' did not occur. When a low density (low bromide content) bromide brine was used, the decrease in G' was very slow. With Ca $Br_2/CaCl_2$ mixed brine, if the brine density was low (for example less than 1.198 kg/L (less than 10 ppg)) fluids were stable for several days; in a 1.557 kg/L (13 ppg) Ca $Br_2/CaCl_2$ mixed brine at 50° C., the fluid lost its viscoelasticity within a few hours. (It should be noted that part of the reason for this is that even when bromide is present in lower density brines, the sodium dodecylbenzene co-surfactant is less necessary for the system to gel, and so its removal by the process described earlier is less deleterious to the system.) If a small amount (for example, 100 to 200 ppm) $FeCl_3$ was added to the system, the decrease in G' was greatly slowed down. Not to be limited by theory, but it is believed that the $FeCl_3$ was acting as a radical scavenger, decreasing the concentration of radicals generated from oxygen or any other source and delaying the reaction. To further demonstrate that a free radical scavenger controls the enhanced oxidative destabilization, sodium thiosulfate was added to the system, and it was found that less than 100 ppm stopped the decrease in G' for one day (this sample was not followed past one day).

What is claimed is:

1. An oilfield treatment composition comprising an aqueous fluid, a non-polymeric viscosifier, an oxidative internal breaker wherein the oxidative breaker is an oxidizing agent and a free radical propagating agent wherein said free radical propagating agent is selected from the group consisting of metabisulfites, reducing sugars, and reducing di-, tri-, oligo- and poly-saccharides.

2. The composition of claim 1 wherein said oxidizing agent is selected from the group consisting of peroxysulfuric acid, persulfates, peroxides, hydroperoxides, azo compounds, peracids, perborates, peresters, bromates, iodates, periodates, permanganates, chlorites, and hyperchlorites.

3. The composition of claim 2 wherein said oxidizing agent comprises a persulfate.

4. The composition of claim 2 wherein said oxidizing agent comprises a bromate.

5. The composition of claim 2 wherein said oxidizing agent comprises a peroxide.

6. The composition of claim 2 wherein said oxidizing agent comprises a peroxymonosulfuric acid salt.

7. The composition of claim 1 further comprising an oxygen scavenger.

8. The composition of claim 7 wherein said oxygen scavenger is selected from the group consisting of sulfites, furanones, hydroxyl amines, trivalent phosphorous compounds, phenolic antioxidants, thiosulfates, metabisulfites, hydrazines, carbohydrazides, hydroquinones, and erythorbates.

9. The composition of claim 1 further comprising a base.

10. The composition of claim 9 wherein said base comprises a carbonate or an amine.

11. The composition of claim 1 wherein said non-polymeric viscosifier comprises a viscoelastic surfactant.

12. The composition of claim 11 wherein said viscoelastic surfactant comprises a zwitterionic surfactant.

13. The composition of claim 12 wherein said zwitterionic surfactant comprises a betaine.

14. The composition of claim 11 wherein said viscoelastic surfactant comprises an amidoamine oxide.

15. The composition of claim 11 wherein said viscoelastic surfactant comprises a betaine, said composition further comprises a co-surfactant comprising an anion, and said oxidizing agent is selected from oxygen, an oxygen source, and air, wherein the betaine is capable of decarboxylating to form a quaternary amine that phase separates or precipitates in the presence of the co-surfactant comprising an anion.

16. The composition of claim 15 wherein said co-surfactant comprises an organic sulfonate.

17. An oilfield treatment composition comprising an aqueous fluid, a betaine surfactant, a free radical initiator, a free radical propagating agent selected from the group consisting of bromide, metabisulfites, reducing sugars, and reducing di-, tri-, oligo- and poly-saccharides, and a co-surfactant comprising an anion, wherein the betaine is capable of decarboxylating to form a quaternary amine that phase separates or precipitates in the presence of the co-surfactant comprising an anion.

18. A method of treating a subterranean formation penetrated by a wellbore comprising a) injecting into the pores of the formation an aqueous gel comprising a non-polymeric viscosifier, an oxidizing agent soluble in the gel and a free radical propagating agent wherein said free radical propagating agent is selected from the group consisting of metabisulfites, reducing sugars, and reducing di-, tri-, oligo- and poly-saccharides, and b) allowing said gel to degrade into a material soluble in a fluid in the pores after the injection.

19. A method of treating a subterranean formation penetrated by a wellbore comprising a) injecting into the pores of the formation an aqueous gel comprising a betaine surfactant, a free radical initiator, a free radical propagating agent selected from the group consisting of bromide, metabisulfites, reducing sugars, and reducing di-, tri-, oligo- and poly-saccharides, and a co-surfactant comprising an anion, and b) allowing the betaine to decarboxylate to form a quaternary amine that phase separates or precipitates in the presence of the co-surfactant after the injection.

* * * * *